United States Patent
Lee et al.

(10) Patent No.: US 9,350,476 B2
(45) Date of Patent: May 24, 2016

(54) METHOD AND USER EQUIPMENT FOR MEASURING INTERFERENCE, AND METHOD AND BASE STATION FOR RECEIVING INTERFERENCE INFORMATION

(75) Inventors: Moon Il Lee, Anyang-si (KR); Jae Hoon Chung, Anyang-si (KR); Hyun Soo Ko, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 13/580,826

(22) PCT Filed: Feb. 22, 2011

(86) PCT No.: PCT/KR2011/001135
§ 371 (c)(1),
(2), (4) Date: Aug. 23, 2012

(87) PCT Pub. No.: WO2011/105726
PCT Pub. Date: Sep. 1, 2011

(65) Prior Publication Data
US 2012/0315859 A1 Dec. 13, 2012

Related U.S. Application Data

(60) Provisional application No. 61/306,972, filed on Feb. 23, 2010.

(30) Foreign Application Priority Data

Jan. 28, 2011 (KR) ........................ 10-2011-0008623

(51) Int. Cl.
*H04B 5/00* (2006.01)
*H04J 11/00* (2006.01)
(Continued)

(52) U.S. Cl.
CPC ............ *H04J 11/005* (2013.01); *H04L 5/0007* (2013.01); *H04L 5/0051* (2013.01); *H04L 5/0094* (2013.01); *H04W 24/10* (2013.01)

(58) Field of Classification Search
CPC ... H04W 24/10; H04W 24/02; H04W 28/048; H04W 72/04; H04W 72/042; H04W 72/082; H04W 72/085; H04W 84/045; H04L 1/00; H04L 1/0026; H04L 5/001; H04L 5/0035; H04L 5/0057; H04L 5/0048; H04L 5/0053; H04L 1/0027; H04L 5/0073; H04L 5/005; H04L 25/0224; H04L 5/0007; H04L 5/0023; H04B 7/0478; H04B 7/0632; H04B 7/065; H04B 17/005; H04B 7/0413; H04B 7/0452; H04B 7/0619; H04B 7/0634; H04B 7/0647
USPC ........................................................ 455/41.1
See application file for complete search history.

(56) References Cited

U.S. PATENT DOCUMENTS

2008/0008113 A1* 1/2008 Cho ................... H04W 52/243
370/318
2008/0305819 A1* 12/2008 Chun .................. H04W 72/042
455/509
(Continued)

FOREIGN PATENT DOCUMENTS

CN 1855768 A 11/2006
CN 101473581 A 7/2009
(Continued)

OTHER PUBLICATIONS

Ericsson: "On CSI RS Design", 3GPP TSG-RAN WG1 #59bis, R1-100048, Jan. 18-22, 2010.
(Continued)

*Primary Examiner* — Ajibola Akinyemi
(74) *Attorney, Agent, or Firm* — Dentons US LLP

(57) ABSTRACT

A method and apparatus for providing information indicating radio resources for multi-cell interference measurement at a BS so that a UE can more accurately measure interference are disclosed.

19 Claims, 17 Drawing Sheets

(51) Int. Cl.
*H04L 5/00* (2006.01)
*H04W 24/10* (2009.01)

(56) References Cited

U.S. PATENT DOCUMENTS

| | | | | |
|---|---|---|---|---|
| 2009/0092059 | A1* | 4/2009 | Fu | H04W 72/082 370/252 |
| 2010/0317343 | A1* | 12/2010 | Krishnamurthy | G01S 1/30 455/435.1 |
| 2011/0176440 | A1* | 7/2011 | Frank | H04W 64/00 370/252 |
| 2011/0217985 | A1* | 9/2011 | Gorokhov | H04W 24/10 455/452.2 |
| 2012/0020230 | A1* | 1/2012 | Chen | H04L 1/0028 370/252 |
| 2012/0076106 | A1* | 3/2012 | Bhattad | H04L 5/0035 370/330 |

FOREIGN PATENT DOCUMENTS

| | | |
|---|---|---|
| KR | 10-2007-0074708 | 7/2007 |
| KR | 10-2009-0034347 | 4/2009 |
| KR | 10-2009-0040929 | 4/2009 |
| KR | 10-2009-0094752 | 9/2009 |

OTHER PUBLICATIONS

NTT Docomo: "CSI-RS Inter-cell Design Aspects", 3GPP TSG RAN WG1 Meeting #59bis, R1-100498, Jan. 18-22, 2010.

LG Electronics: "CSI-RS Design Aspects for ICI Measurement in LTE-A", 3GPP TSG RAN WG1 Meeting #60, R1-101236, Feb. 22-26, 2010.

Marvell: "Proposal for Improving Interference Estimation", 3GPP TSG-RAN WG1 #53, R1-081824, May 5-9, 2008.

* cited by examiner

● : CSI-RS transmission of cell A

METHOD AND USER EQUIPMENT FOR MEASURING INTERFERENCE, AND METHOD AND BASE STATION FOR RECEIVING INTERFERENCE INFORMATION

This Application is a 35 U.S.C. §371 National Stage Entry of International Application No. PCT/KR2011/001135, filed Feb. 22, 2011 and claims the benefit of U.S. Provisional Application No. 61/306,972, filed Feb. 23, 2010 and Korean Application No: 10-2011-0008623, filed Jan. 28, 2011, all of which are incorporated by reference in their entirety herein.

TECHNICAL FIELD

The present invention relates to a wireless communication system, and more particularly, to a method and apparatus for measuring interference and a method and apparatus for transmitting information for interference measurement and/or channel estimation.

BACKGROUND ART

In a wireless communication system, a transmitter transmits a signal on a radio channel. During the transmission, the signal may experience unexpected distortion. The transmitter may precode the signal prior to transmission to a receiver. To efficiently receive and/or detect the original signal, the receiver needs information about the state of the radio channel, information about interference to the transmission signal, and/or information for demodulating the transmission signal. The receiver may acquire the original signal more accurately by correcting the distortion of the transmission signal using the information.

For the receiver to accurately estimate the state of the radio channel and measure interference that signals other than the transmission signal cause to the radio channel, there exists a need for an appropriate configuration for a signal for channel estimation and/or interference measurement and a technique for measuring interference using the signal.

DISCLOSURE OF INVENTION

Technical Problem

An object of the present invention devised to solve the problem lies on a method and Base Station (BS) for effectively transmitting data and/or a reference signal and a method and User Equipment (UE) for measuring a channel state and/or interference using the data and/or the reference signal received from the BS.

Another object of the present invention devised to solve the problem lies on a method and apparatus for increasing the accuracy with which inter-cell interference is measured.

Another object of the present invention devised to solve the problem lies on a method and apparatus for configuring multi-cell reference signals so as to reduce the transmission overhead of reference signals designated for channel estimation.

A further object of the present invention devised to solve the problem lies on a method and apparatus for muting data resource elements of a serving cell, on which reference signals of a neighbor cell are delivered, in order to maximize the accuracy of measuring the channel states of the serving cell and the neighbor cell.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing a method and apparatus for increasing the number of reuse patterns of reference signals designated for channel state measurement.

In another aspect of the present invention, provided herein is a method and apparatus for configuring the muting cycle and/or muting pattern of reference signals, for multi-cell channel estimation.

In another aspect of the present invention, provided herein is a method and apparatus for performing multi-cell channel estimation on a resource block/subframe including a muted resource element.

In another aspect of the present invention, provided herein is a method and apparatus for transmitting to a user equipment information indicating radio resources in which the user equipment is allowed to measure interference.

In a further aspect of the present invention, provided herein is a method and apparatus for measuring interference in radio resources indicated by a base station.

As one aspect of the present invention, provided herein is a method for measuring interference at a User Equipment (UE) in a wireless communication system, the method comprising: receiving from a Base Station (BS) interference measurement resource information indicating radio resources in which interference is to be measured; and performing interference measurement by measuring a signal received on the radio resources based on the interference measurement resource information.

As another aspect of the present invention, provided is a method for receiving interference information at a Base Station (BS) in a wireless communication system, the method comprising: transmitting to a User Equipment (UE) interference measurement resource information indicating radio resources in which the UE is to measure interference; muting the radio resources; and receiving interference information from the UE, which the UE feedbacks based on an interference measurement performed on the radio resources.

As a further aspect of the present invention, provided is a User Equipment (UE) for measuring interference in a wireless communication system, comprising: a receiver; and a processor, operatively coupled to the receiver, configured to control the receiver, wherein the receiver is configured to receive from a Base Station (BS) interference measurement resource information indicating radio resources in which interference is to be measured, and the processor is configured to perform interference measurement by measuring a signal received on the radio resources based on the interference measurement resource information.

As a still further aspect of the present invention, provided is a Base Station (BS) for receiving interference information in a wireless communication system, comprising: a transmitter; a receiver; and a processor, operatively coupled to the transmitter and the receiver, configured to control the transmitter and the receiver, wherein the processor is configured to control the transmitter to transmit to a User Equipment (UE) interference measurement resource information indicating radio resources in which the UE is to measure interference, control the transmitter to mute the radio resources, and controls the receiver to receive interference information fed back based on an interference measurement performed on the radio resources by the UE.

In each aspect of the present invention, the interference measurement resource information can indicate an interference measurement subframe in which interference is to be measured.

In each aspect of the present invention, the interference measurement subframe can include radio resources in which a signal of a neighbor cell is not muted, and the interference measurement can comprise performing the interference measurement in the radio resources in which the signal of the neighbor cell is not muted.

In each aspect of the present invention, the interference measurement information can indicate radio resources in which a signal of one of a serving cell and a neighbor cell is muted, and the interference measurement can comprise performing the interference measurement in radio resources other than the radio resources in which the signal of one of the serving cell and the neighbor cell is muted.

In each aspect of the present invention, information indicating the muted radio resources can include information indicating a position of a subframe including the muted radio resources in a frame and a transmission period of the subframe, and the interference measurement can comprise performing the interference measurement in a subframe other than the subframe.

In each aspect of the present invention, the interference measurement resource information can indicate an interference measurement subframe in which the UE is to measure interference.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Advantageous Effects of Invention

Embodiments of the present invention have the following effects.

Since the reuse patterns of reference signals designated for channel state measurement are increased in number, neighbor cells can transmit their reference signals in different radio resources.

The accuracy of channel state estimation of multiple cells can be increased through appropriate definition of the muting cycles and/or muting patterns of reference signals.

As multi-cell channel measurement is performed in a resource block/subframe including a muted resource element, the channel estimation performance of each cell can be increased.

Furthermore, the performance of measuring interference that another cell or other cells cause to each cell can be increased because multi-cell interference measurement is performed on a resource block/subframe including a muted resource element.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODE FOR THE INVENTION

Figure 1:
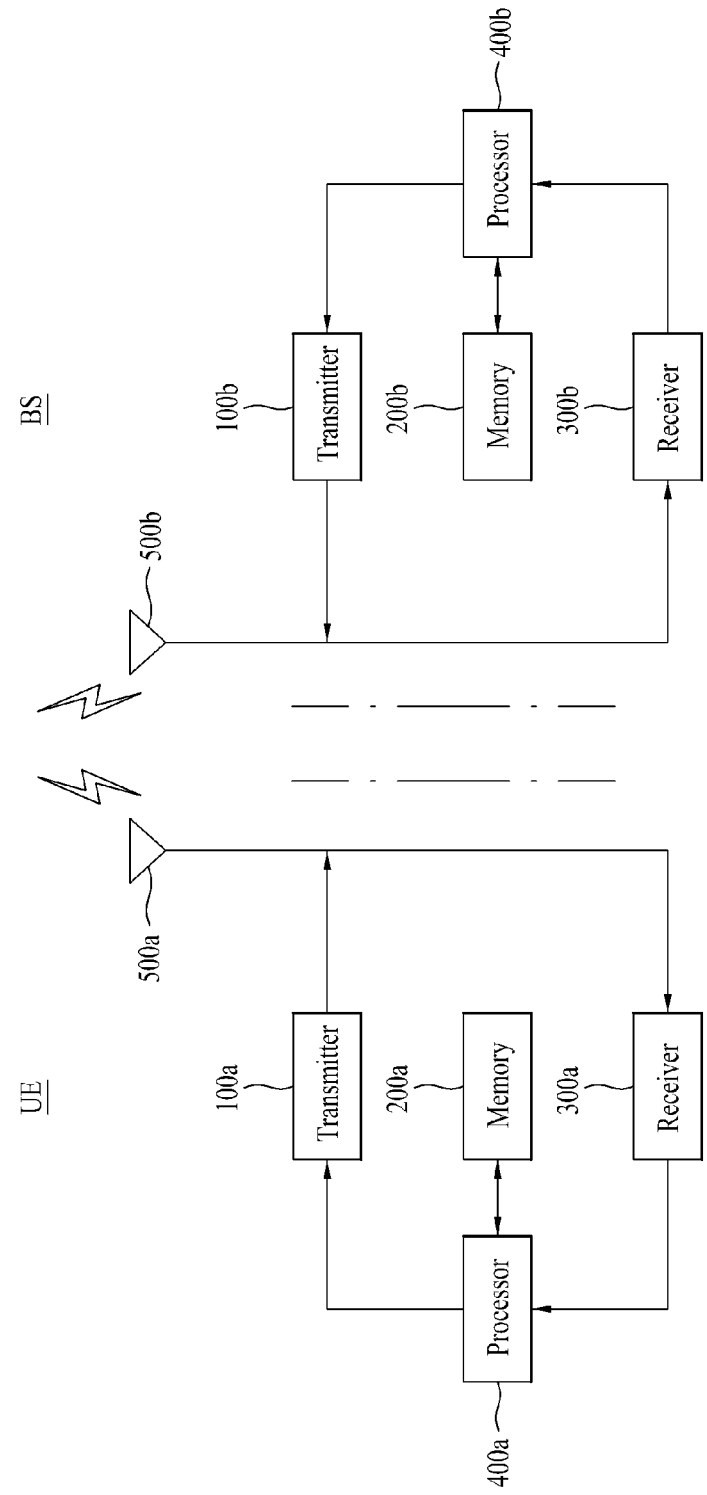
FIG. 1 is a block diagram of a User Equipment (UE) and a Base Station (BS) for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatuses and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as Institute of Electrical and Electronics Engineers (IEEE) 802.11 (Wi-Fi), IEEE 802.16 (WiMAX), IEEE 802.20, EvolvedUTRA (E-UTRA) etc. UTRA is a part of Universal Mobile Telecommunication System (UMTS). 3rd Generation Partnership Project (3GPP) Long Term Evolution (LTE) is a part of Evolved-UMTS (E-UMTS) using E-UTRA. 3GPP LTE employs OFDMA for downlink and employs SC-FDMA for uplink. LTE-Advanced (LTE-A) is an evolution of 3GPP LTE. For clarity, this application focuses on the 3GPP LTE/LTE-A. However, technical features of the present invention are not limited thereto. For example, although the following description will be made based on a mobile communication system corresponding to an 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a Base Station (BS). The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a BS means a fixed station that performs communication with a UE and/or another BS, and exchanges various kinds of data and control information with the UE and another BS. The BS may be referred to as another terminology such as an evolved-Node B (eNB), a Base Transceiver System (BTS), and an Access Point (AP).

Hereinafter, a Physical Downlink Control CHannel (PDCCH)/Physical Control Format Indicator CHannel (PCFICH)/Physical Hybrid ARQ Indicator CHannel (PHICH)/Physical Downlink Shared CHannel (PDSCH)/Dedicated Reference Signal (DRS)/Common Reference Signal (CRS)/DeModulation Reference Signal (DMRS)/Channel State Information-Reference Signal (CSI-RS) Resource Element (RE) represents an RE assigned to or available for PDCCH/PCFICH/PHICH/PDSCH/DRS/CRS/DMRS/CSI-RS. Especially, an RE carrying an RS is referred to as an RS RE and an RE carrying control information or data is referred to as a data RE.

Hereinafter, a symbol/carrier/subcarrier to which a DRS/CRS/DMRS/CSI-RS is allocated will be referred to as a DRS/CRS/DMRS/CSI-RS symbol/carrier/subcarrier. For example, a symbol carrying a CSI-RS is referred to as a CSI-RS symbol and a subcarrier carrying a CSI-RS is referred to as a CSI-RS subcarrier.

Meanwhile, in the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

Hereinafter, if a specific signal within a frame, subframe, slot, symbol, carrier or subcarrier is not transmitted from its transmission location, it will be expressed that transmission of the specific signal has been dropped, muted, nulled or blanked. For example, if a transmitter transmits a specific signal with zero transmission power on a predetermined RE, it may be said that the transmitter has dropped transmission of the specific signal, has muted or blanked the predetermined RE, or transmits a null signal on the predetermined RE.

According to the present invention, when a specific signal is transmitted at every predetermined interval, this interval is called the duty cycle of the specific signal. In addition, if a specific signal is muted at every predetermined interval, this interval is called the muting cycle of the specific signal.

The term "cell" refers to a certain geographical area to which a BS or an antenna group provides a communication service in the present invention. Therefore, communication with a specific cell may be equivalent to communication with an antenna group that provides a communication service in the specific cell. A downlink/uplink signal in the specific cell is a downlink/uplink signal from or to the antenna group that provides a communication service in the specific cell. In addition, the channel state/quality of the specific cell is the channel state/quality of a channel or communication link established between the antenna group and a specific UE in a geographical area corresponding to the specific cell.

FIG. 1 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are operatively coupled to the components of the UE and the BS, such as the transmitters 100a and 100b, the receivers 300a and 300b, and the memories 200a and 200b, and adapted to perform the present invention by controlling the components. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
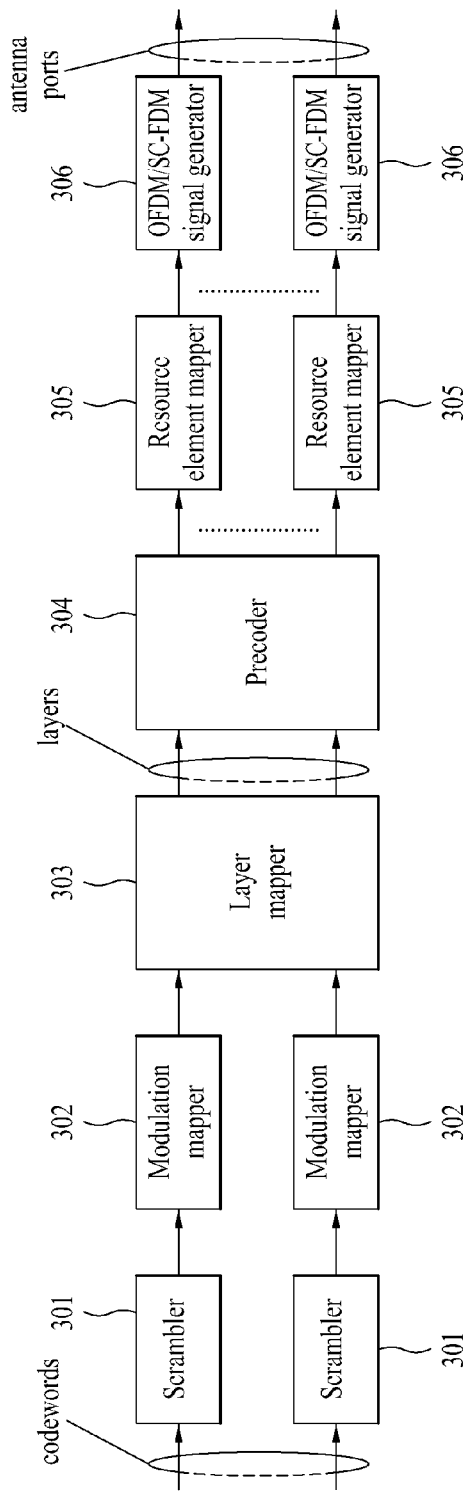
FIG. 2 is an exemplary block diagram of a transmitter in each of the UE and the BS.

FIG. 2 is a block diagram of an exemplary transmitter in each of the UE and the BS. Operations of the transmitters 100a and 100b will be described below in more detail with reference to FIG. 2.

Referring to FIG. 2, each of the transmitters 100a and 100b include scramblers 301, modulation mappers 302, a layer mapper 303, a precoder 304, RE mappers 305, Orthogonal Frequency Division Multiplexing/Single Carrier Frequency Division Multiplexing (OFDM/SC-FDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PKS) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-$N_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z.

The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM/SC-FDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM/SC-FDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$ to a receiver after digital-to-analog conversion, frequency upconversion, etc. The OFDM/SC-FDM signal generators 306 may include an IFFT module, a CP inserter, a Digital-to-Analog Converter (DAC), a frequency upconverter, etc.

If the transmitters 100a and 100b adopt SC-FDMA for transmitting a codeword, the transmitters 100a and 100b include an FFT processor (not shown). The FFT processor performs FFT on the complex modulation symbols for each antenna and outputs the FFT symbol to the RE mappers 305.

The receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. A signal received through each reception antenna is down-converted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

If the receivers 300a and 300b receive SC-FDM signals, each of the receivers 300a and 300b further includes an IFFT module. The IFFT module IFFT-processes the antenna-specific symbols recovered by the RE demapper and outputs the IFFT symbol to the multiplexer.

While it has been described in FIGS. 1 and 2 that each of the transmitters 100a and 100b includes the scramblers 301, the modulation mappers 302, the layer mapper 303, the precoder 304, the RE mappers 305, and the OFDM/SC-FDM signal generators 306, it may be further contemplated that the scramblers 301, the modulation mappers 302, the layer mapper 303, the precoder 304, the RE mappers 305, and the OFDM/SC-FDM signal generators 306 are incorporated into each of the processors 400a and 400b of the transmitters 100a and 100b. Likewise, while it has been described in FIGS. 1 and 2 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For the convenience's sake of description, the following description will be given with the appreciation that the scramblers 301, the modulation mappers 302, the layer mapper 303, the precoder 304, the RE mappers 305, and the OFDM/SC-FDM signal generators 306 are included in the transmitters 100a and 100b configured separately from the processors 400a and 400b that controls their operations, and the signal recoverer, the multiplexer, and the channel demodulator are included in the receivers 300a and 300b configured separately from the processors 400a and 400b that controls their operations. However, it is to be noted that even though the scramblers 301, the modulation mappers 302, the layer mapper 303, the precoder 304, the RE mappers 305, and the OFDM/SC-FDM signal generators 306 are included in the processors 400a and 400b or the signal recoverer, the multiplexer, and the channel demodulator are included in the processors 400a and 400b, embodiments of the present invention are applicable in the same manner.

Figure 3:
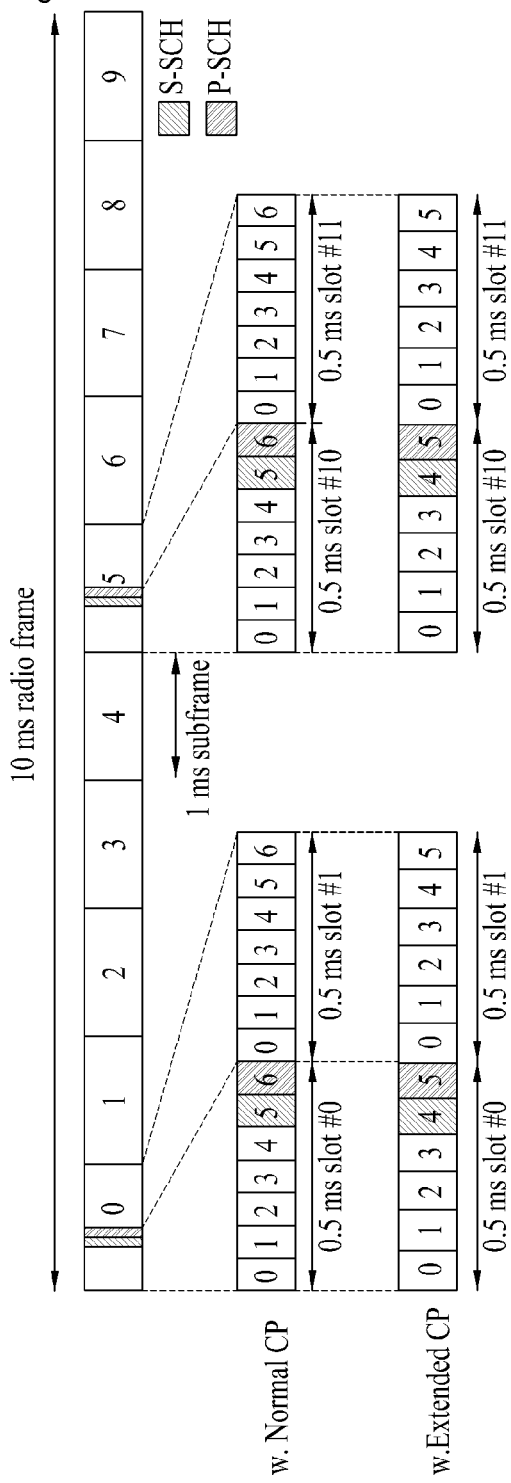
FIG. 3 illustrates an exemplary structure of a radio frame in a wireless communication system.

FIG. 3 illustrates an exemplary structure of a radio frame in a wireless communication system. Specifically, the radio frame is a 3GPP LTE/LTE-A radio frame. The radio frame structure is applicable to a Frequency Division Duplex (FDD) mode, a half FDD (H-FDD) mode, and a Time Division Duplex (TDD) mode.

Referring to FIG. 3, a 3GPP LTE/LTE-A radio frame is 10 ms (307,200 $T_s$) in duration. The radio subframe is divided into 10 equally-sized subframes, each subframe being 1 ms long. $T_s$ represents a sampling time and is given as $T_s=1/(2048\times15 \text{ kHz})$. Each subframe is further divided into two slots, each of 0.5 ms in duration. 20 slots are sequentially numbered from 0 to 19. A time interval in which one subframe is transmitted is defined as a Transmission Time Interval (TTI).

Figure 4:
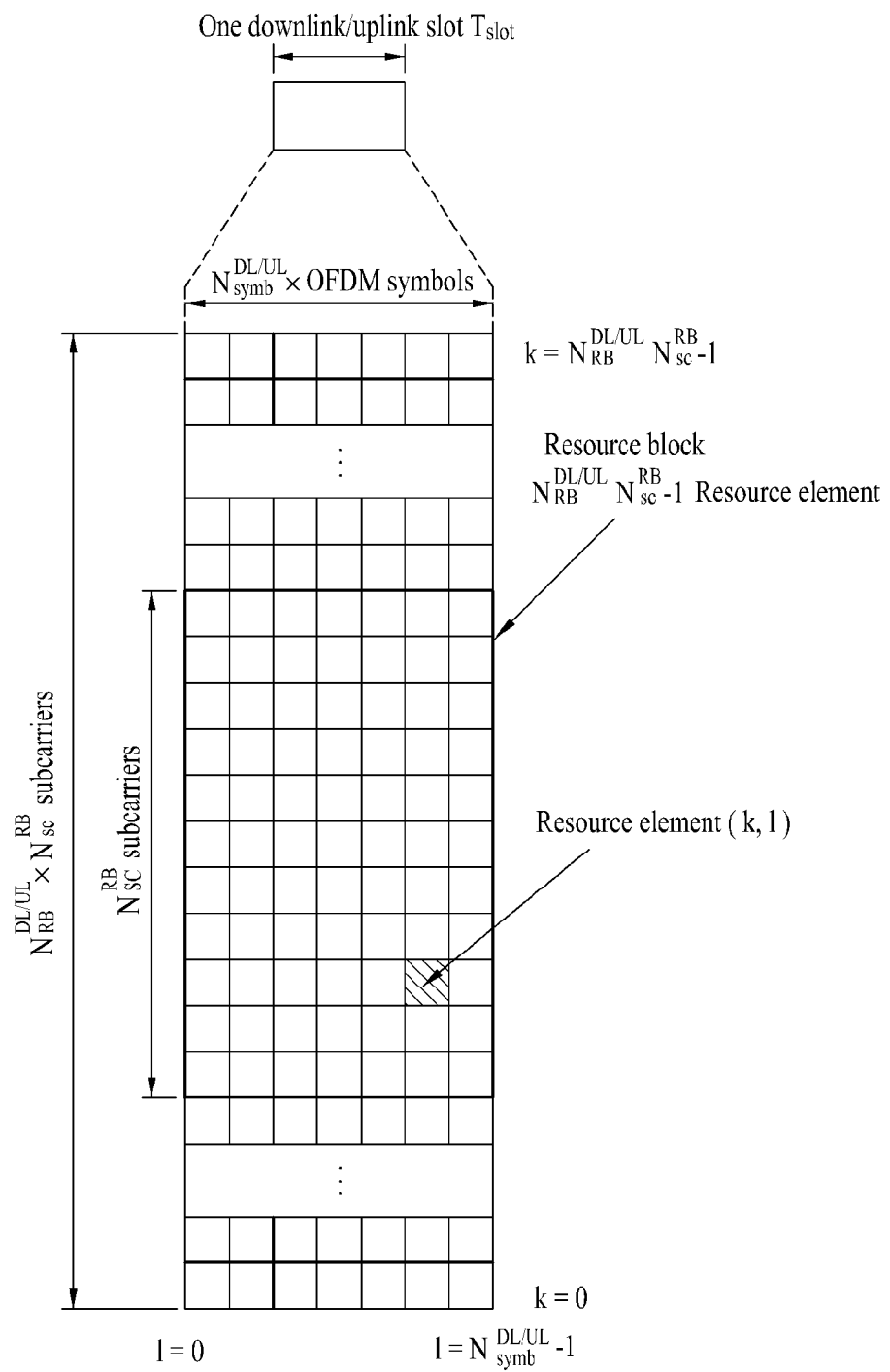
FIG. 4 illustrates an exemplary structure of a DownLink/UpLink (DL/UL) slot in the wireless communication system.

FIG. 4 illustrates an exemplary structure of a DownLink/UpLink (DL/UL) slot in the wireless communication system. Specifically, FIG. 4 illustrates the structure of a resource grid in the 3GPP LTE/LTE-A system.

Referring to FIG. 4, a slot includes a plurality of OFDM symbols in the time domain by a plurality of Resource Blocks (RBs) in the frequency domain. An OFDM symbol may refer to one symbol duration. An RB includes a plurality of sub-carriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 4 as having a slot with 7 OFDM symbols for illustrative purposes, embodiments of the present invention are also applicable to subframes with any other number of OFDM symbols. A resource including one OFDM symbol by one subcarrier is referred to as a Reference Element (RE) or a tone.

Referring to FIG. 4, a signal transmitted in each slot may be described by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb} \times N^{RB}_{sc}$ REs.

Each RE in the resource grid may be uniquely identified by an index pair (k, l) in a slot. k is a frequency-domain index ranging from 0 to $N^{DL/UL}_{RB} \times N^{RB}_{sc}-1$ and l is a time-domain index ranging from 0 to $N^{DL/UL}_{symb}-1$.

Figure 5:
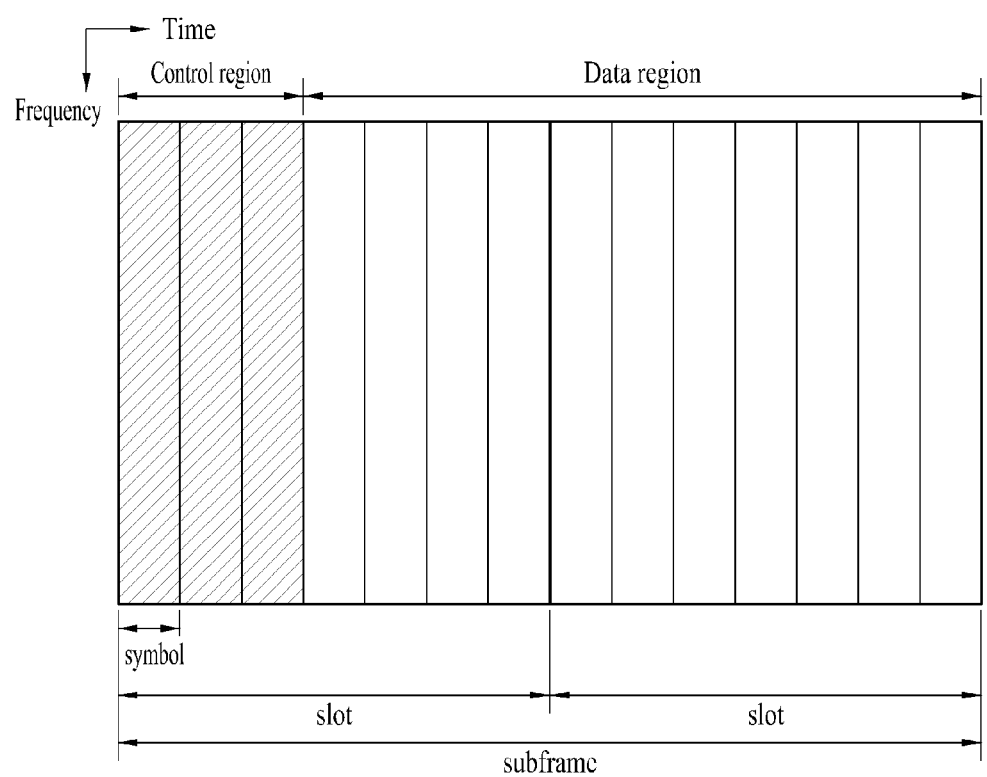
FIG. 5 illustrates an exemplary structure of a DL subframe in the wireless communication system.

FIG. 5 illustrates an exemplary structure of a DL subframe in the wireless communication system.

Referring to FIG. 5, each subframe may be divided into a control region and a data region. The control region includes one or more OFDM symbols, starting from the first OFDM symbol. The number of OFDM symbols used for the control region of a subframe may be set independently on a subframe basis and signaled on a PCFICH. A BS may transmit control information to a UE or UEs in the control region. To transmit control information, a PDCCH, a PCFICH, a PHICH, etc. may be allocated to the control region.

The BS may transmit data to a UE or UE group in the data region. Data transmitted in the data region is referred to as user data. A PDSCH may be allocated to the data region to convey data. A UE may decode control information received on a PDCCH and thus read data received on a PDSCH based on the decoded control information. For example, the PDCCH carries information indicating a UE or UE group to which the data of the PDSCH is destined and information indicating how the UE or UE group should receive and decode the PDSCH data.

The PDCCH delivers information about the transport format and resource allocation of a DownLink Shared CHannel (DL-SCH), resource allocation information about an UpLink Shared CHannel (UL-SCH), paging information about a Paging CHannel (PCH), system information about the DL-SCH, allocation information of a higher-layer control message such as a random access response transmitted on a PDSCH, a collection of Transmission Power Control (TPC) commands for the UEs of a UE group, activation information about Voice over Internet Protocol (VoIP), etc. A plurality of PDCCHs may be transmitted in the control region. A UE may detect its own PDCCH by monitoring the plurality of PDCCHs. The size and usage of control information transmitted on a PDCCH may vary according to a Downlink Control Information (DCI) format and the size of the control information may vary according to coding rates.

An independent DCI format applies to each UE and PDCCHs for a plurality of UEs may be multiplexed in one subframe. The PDCCH of each UE is independently channel-encoded and added with a Cyclic Redundancy Check (CRC). The CRC is masked by a unique ID of the UE so that the UE may receive its own PDCCH. Basically, however, without knowledge of the position of its own PDCCH, the UE performs blind detection (or blind decoding) on all PDCCHs with a specific DCI format until it receives a PDCCH having its ID.

Figure 6:
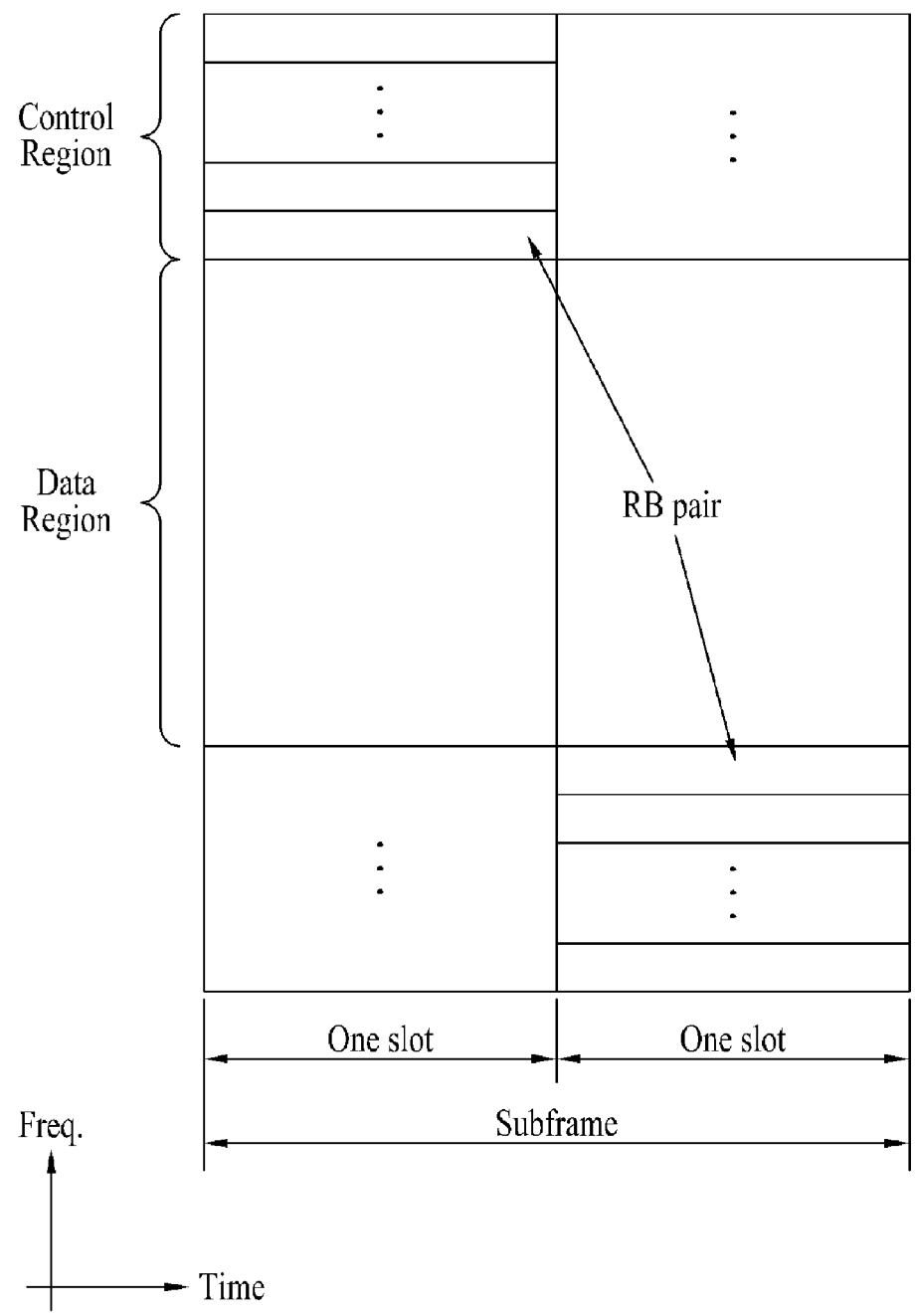
FIG. 6 illustrates an exemplary structure of a UL subframe in the wireless communication system.

FIG. 6 illustrates an exemplary structure of a UL subframe in the wireless communication system.

Referring to FIG. 6, a UL subframe may be divided into a data region and a control region in the frequency domain. One or more Physical Uplink Control CHannels (PUCCHs) may be allocated to the control region to deliver Uplink Control Information (UCI). One or more Physical Uplink Shared Channels (PUSCHs) may be allocated to the data region to deliver user data. If a UE adopts SC-FDMA for uplink transmission, it may not transmit a PUCCH and a PUSCH simultaneously to maintain single carrier characteristics. A PUCCH for a UE is allocated to an RB pair in a subframe. The RBs of the RB pair occupy different subcarriers in two slots. This is called frequency hopping of an RB pair allocated to a PUCCH over a slot boundary.

Various types of RSs are transmitted between a BS and a UE for the purposes of interference mitigation, estimation of the channel state between the BS and the UE, demodulation of signals transmitted between the BS and the UE, etc. An RS refers to a predefined signal with a special waveform known to both the BS and the UE, transmitted from the BS to the UE or from the UE to the BS. An RS is also called a pilot signal.

Figure 7:
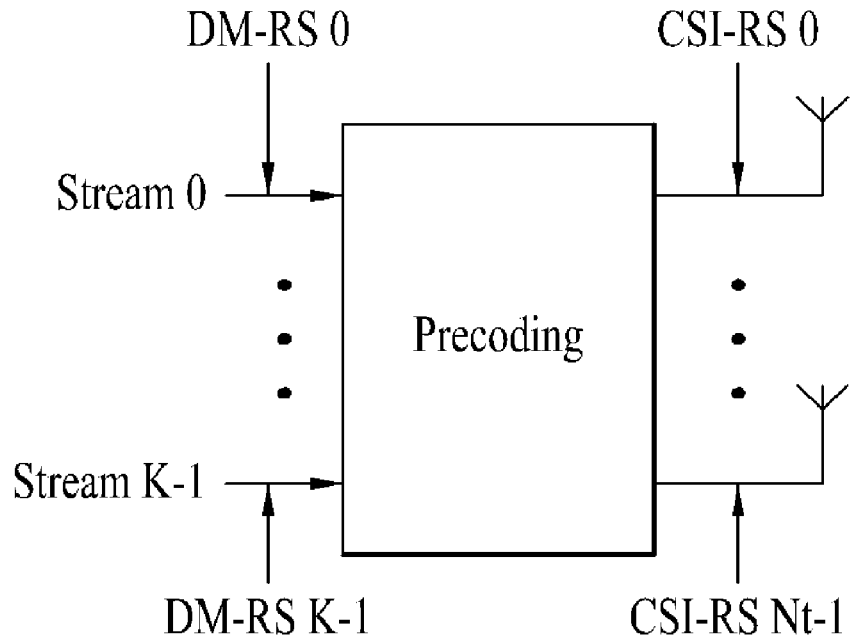
FIGS. 7 and 8 are conceptual views of Reference Signal (RS) transmissions.
Figure 8:
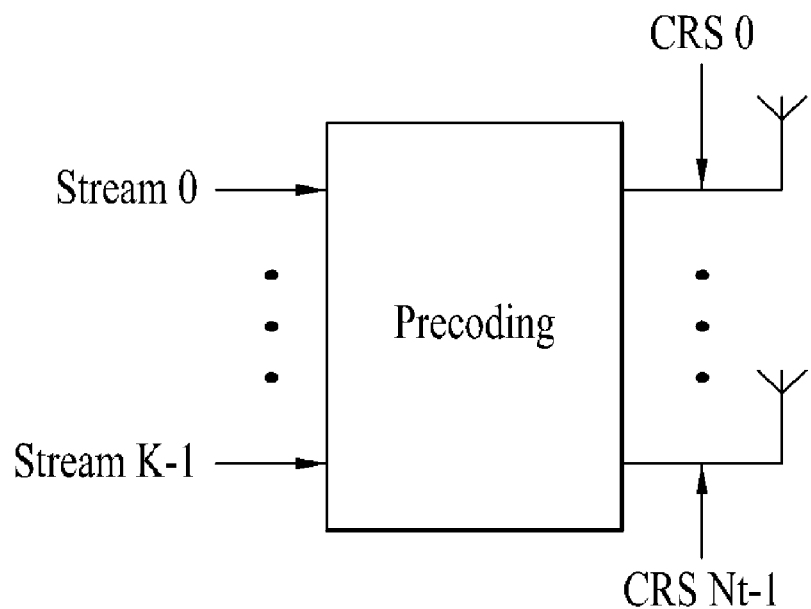

FIGS. 7 and 8 are conceptual views of RS transmissions. Specifically, FIG. 7 illustrates a precoder-based transmitter for transmitting DRSs and CSI-RSs, and FIG. 8 illustrates a precoder-based transmitter for transmitting CRSs.

RSs are largely classified into DRSs and CRSs. The CRSs and DRSs are also called cell-specific RSs and DMRSs, respectively. The DMRSs are also called UE-specific RSs.

Referring to FIG. 7, a DRS is usually used for demodulation, dedicated to a specific UE. DRSs may be classified into precoded RSs and non-precoded RSs. If precoded RSs are used as DRSs, the DRSs are precoded with a precoding matrix used for precoding data symbols, and as many RS sequences as K layers are transmitted. K is equal to or less than the number of antenna ports, $N_t$. The K layers may be allocated to one or more UEs. If a plurality of UEs share the K layers, 1 UE to K UEs may receive the K layers in the same time/frequency resources.

Referring to FIG. 8, a CRS is transmitted in every DL subframe in a cell supporting PDSCH transmission. CRSs are used for both purposes of demodulation and measurement and shared among all UEs within the cell. A CRS sequence is transmitted through every antenna port irrespective of the number of layers.

In an LTE system supporting up to two layers, a BS simultaneously transmits the layers together with DRSs for demodulation of the layers and CRSs for estimation of a channel between a UE and the BS. On the other hand, if DRSs and CRSs are transmitted together in a system supporting transmission of two or more layers such as an LTE-A system, overall RS overhead increases with the number of layers. To avert this problem, the LTE-A system uses RSs separately for demodulation and channel estimation, instead of CRSs that increase RS transmission overhead according to the number of antenna ports. DRSs may be used as demodulation RSs.

Since DRSs precoded in the same precoder as used for data are available for demodulation only, channel estimation RSs are separately transmitted for measuring channel state/quality. A UE may feedback the channel state/quality of a cell to a BS covering the cell using channel estimation RSs.

Figure 9:
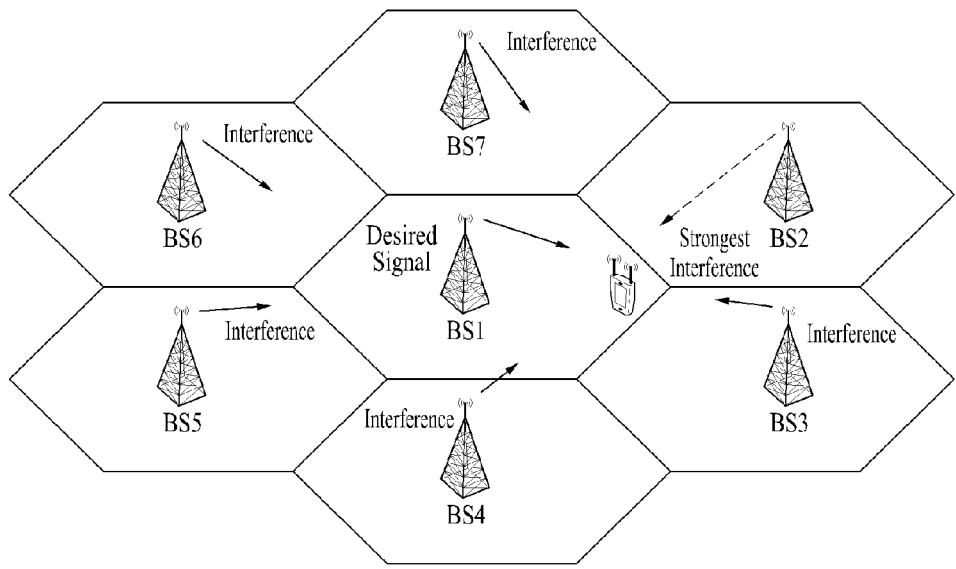
FIG. 9 illustrates the concept of a cellular wireless communication system.

FIG. 9 illustrates the concept of a cellular wireless communication system.

A plurality of BSs are deployed to cover the whole area of a specific wireless communication system and each BS is configured to provide a specific wireless communication service to UEs within a certain area. All BSs may provide the same communication service or different communication services. Recently, a multi-cellular wireless communication system has been designed such that a plurality of adjacent BSs can communicate with UEs in the same frequency band.

Figure 10:
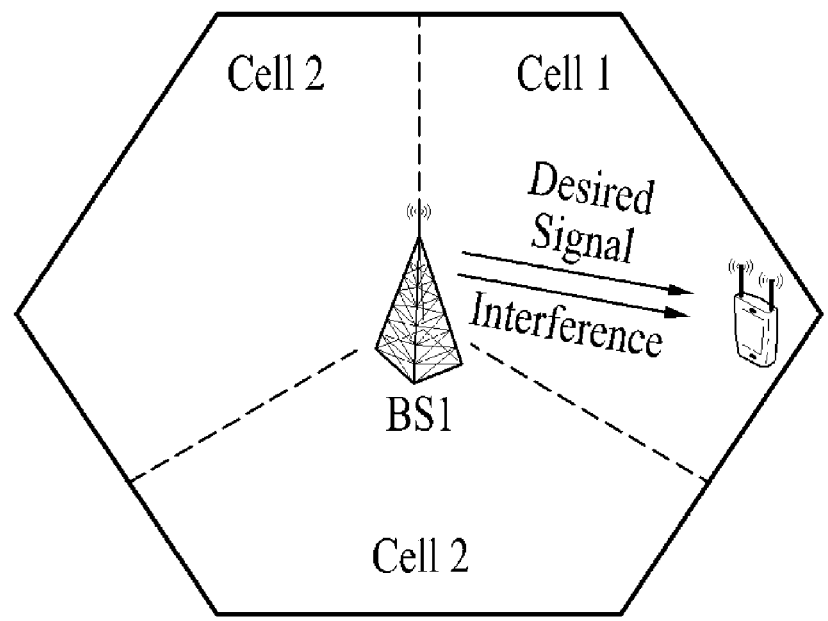
FIG. 10 illustrates the concept of a wireless communication system in which an independent cell is divided into a plurality of sectors.

FIG. 10 illustrates the concept of a wireless communication system in which a plurality of sectors are defined in an independent cell.

As stated before with reference to FIG. 9, each BS generally provides a communication service to a certain geographical area. To improve system performance, the geographical area may be segmented into a plurality of smaller areas, Cell 1, Cell 2 and Cell 3. These smaller areas may be referred to as cells, sectors or segments. Signal interference occurs between cells of the same BS as illustrated in FIG. 10 as well as between cells of different BSs as illustrated in FIG. 9.

Negligence of the influence of interference from neighbor cells may lead to degradation of overall system performance in the multi-cellular system. For instance, referring to FIG. 9, if a specific UE is located between BS1 and BS2, signals transmitted to the UE in the same frequency band from BS1 and BS2 affect the UE with similar strengths. DL signals from BS1 and BS2 interfere with each other. If a communication system is configured without taking into account such interference, CSI (or Channel Quality Information (CQI)) that a UE feeds back to a BS becomes inaccurate, thereby making it difficult to optimize system throughput.

Thus, in order to optimize system throughput, it is important to configure a communication system such that a UE can accurately measure the channel state of a serving cell, taking into account the states of channels established between the UE and neighbor cells and/or the magnitudes of interference from the neighbor cells.

In this context, a description will be given of a method for configuring RSs for channel state measurement that enable measurement of the channel state of each cell and/or neighbor cell interference to the cell, minimizing inter-cell interference, and a method for measuring a channel state and/or interference using the same. Hereinafter, an RS for measuring a channel state is referred to as a CSI-RS.

<CSI-RS Configuration>

For channel state estimation of a serving cell and a neighbor cell, cell-specific CSI-RSs are usually used. To enable a UE to more accurately measure the channel state of a specific cell (or a specific antenna group transmission point), cells neighboring to the specific cell may transmit null signals on subcarriers in an OFDM symbol carrying CSI-RSs of the specific cell. This operation is called RE muting. If a specific RE is muted in a cell, a DL signal of the cell is not transmitted to a UE on the specific RE. Therefore, the cell does not affect the UE's measurement of channel state and/or interference on the RE. That is, a signal transmitted from the specific cell may be excluded from the channel state and/or interference measurement.

To prevent collision between CSI-RSs transmitted from neighboring cells and CSI-RS dropping caused by RE muting, CSI-RSs of the neighboring cells should not be carried at the same positions. Accordingly, resources to which the CSI-RSs of the neighboring cells are allocated are preferably orthogonal. This CSI-RS orthogonality may be achieved by defining CSI-RS patterns so that the CSI-RSs of the neighboring cells do not overlap in a predetermined time/frequency resource area. Hereinbelow, the positions of REs to which CSI-RSs are allocated in an RB pair are referred to as a CSI-RS pattern.

Figure 11:
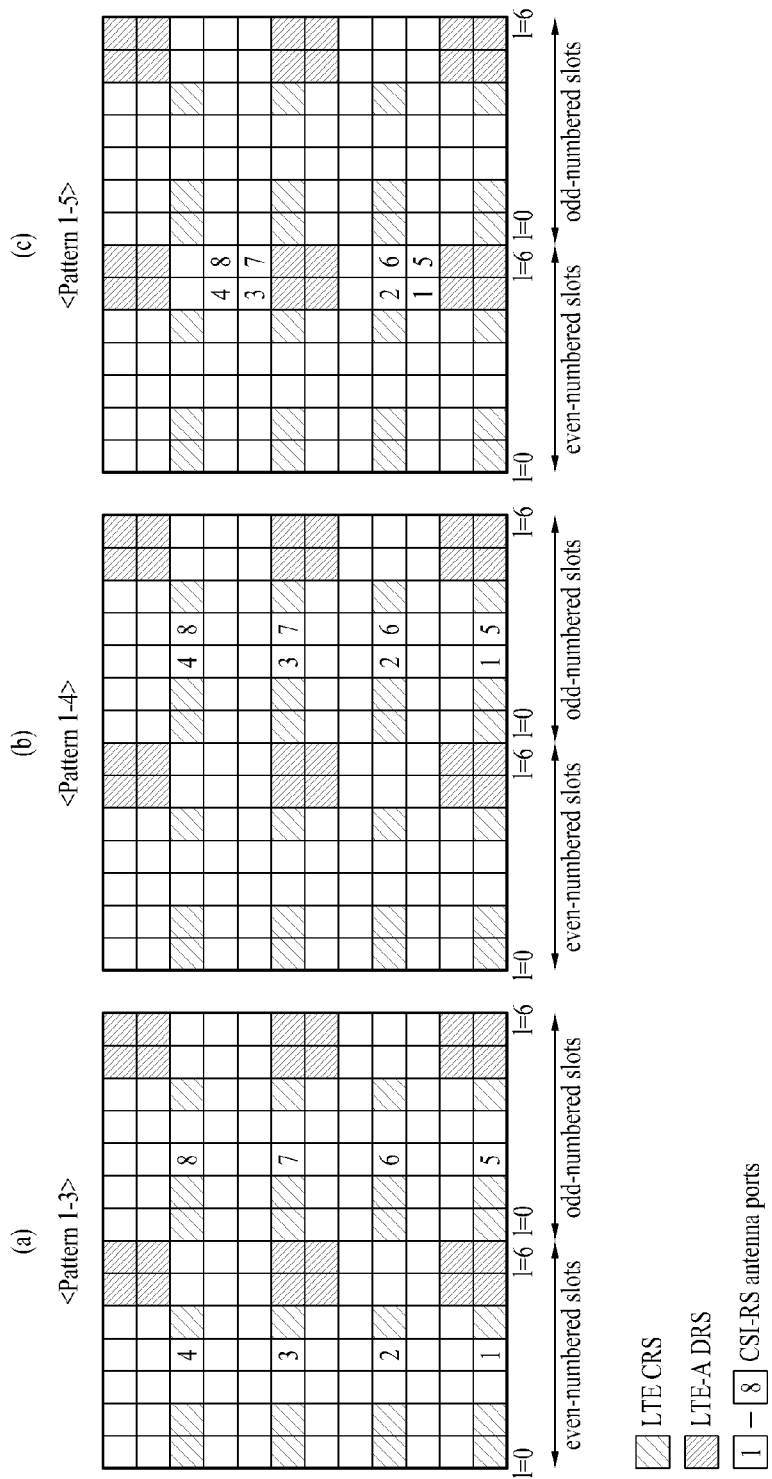
FIG. 11 illustrates exemplary Channel State Information-RS (CSI-RS) patterns.

FIG. 11 illustrates exemplary CSI-RS patterns.

CSI-RSs, which are transmitted at every predetermined interval, are transmitted in a predetermined pattern on each subframe corresponding to the interval. Various CSI-RS patterns may be defined, which prevent overlap between REs occupied by CSI-RSs of neighboring cells, that is, between CSI-RS REs of the neighboring cells. Apart from the exemplary CSI-RS patterns illustrated in FIG. 11, many CSI-RS patterns may be defined as far as REs used for CSI-RSs are not overlapped. As more CSI-RS patterns are available for a subframe, neighboring cells are more likely to transmit their CSI-RSs without collision in a subframe.

Referring to FIG. 11, if Pattern 1-3 or Pattern 1-4 is defined as a CSI-RS pattern in a subframe, other CSI-RS patterns orthogonal to the Pattern 1-3 and Pattern 1-4 may be further configured by subcarrier shift (v-shift) or OFDM symbol shift (t-shift) in the subframe.

Figure 12:
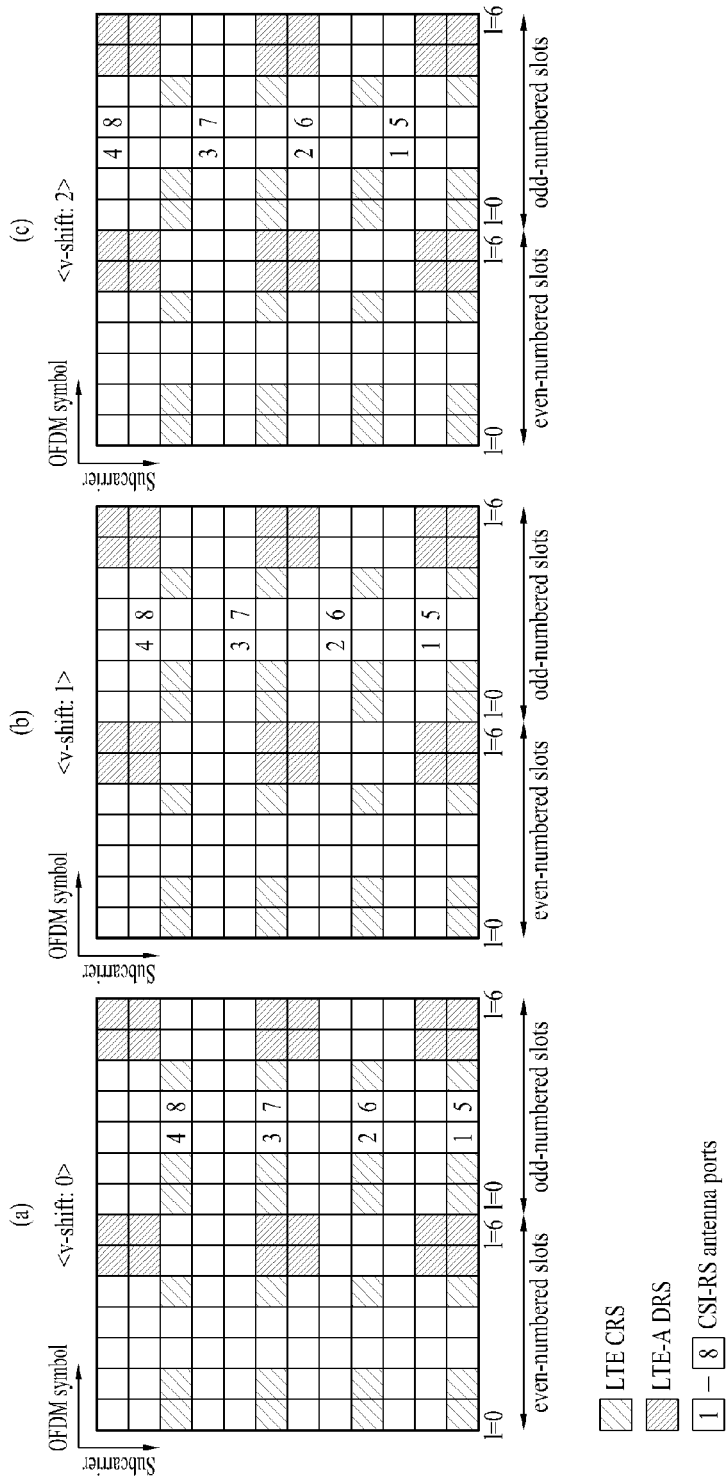
FIG. 12 illustrates exemplary CSI-RS patterns configured by subcarrier shift.
Figure 13:
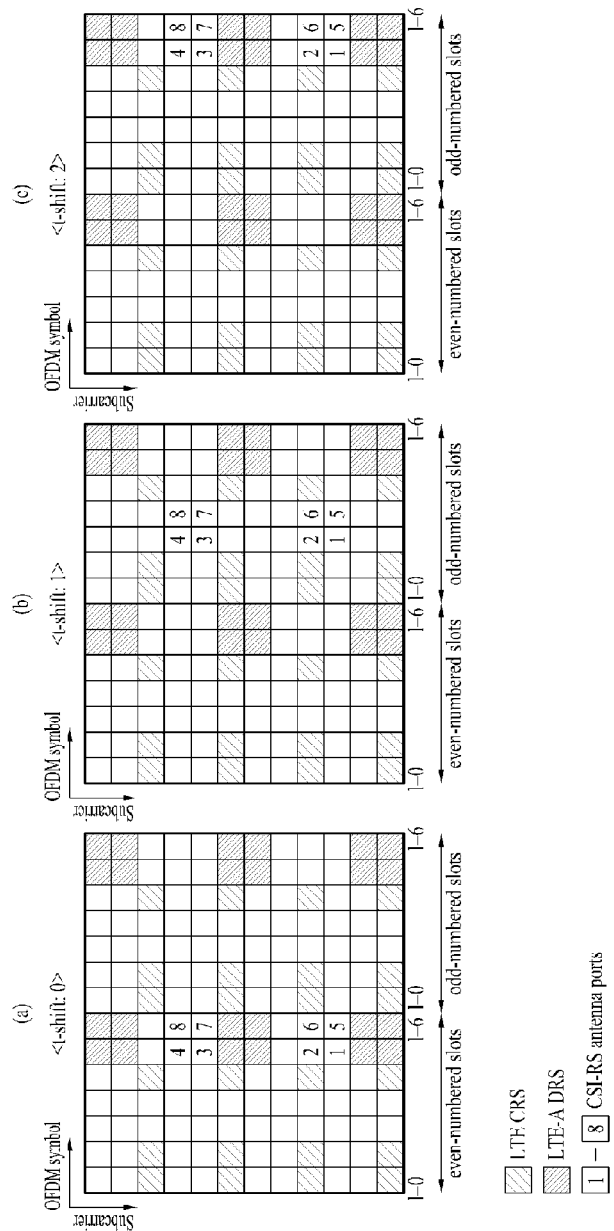
FIG. 13 illustrates exemplary CSI-RS patterns configured by Orthogonal Frequency Division Multiplexing (OFDM) symbol shift.

FIG. 12 illustrates exemplary CSI-RS patterns formed through subcarrier shift and FIG. 13 illustrates exemplary CSI-RS patterns formed through OFDM symbol shift.

Three different CSI-RS patterns may be obtained by applying three types of subcarrier shifts to Pattern 1-4. Notably, the subcarrier shifts are performed such that the REs of CSI-RS patterns resulting from subcarrier-shifting of a base CSI-RS pattern are not overlapped with the REs of other types of RSs, for example, CRS REs and DRS REs.

Referring to FIG. 12, a CSI-RS pattern with v-shift: 1 is configured by shifting Pattern 1-4 by one subcarrier and a CSI-RS pattern with v-shift: 2 is configured by shifting Pattern 1-4 by two subcarriers. A CSI-RS pattern with v-shift: 0 illustrated in FIG. 12 is identical to Pattern 1-4 without subcarrier shift, illustrated in FIG. 11.

Three different CSI-RS patterns may be produced by applying three types of OFDM symbol shifts to Pattern 1-3 illustrated in FIG. 11. Notably, the OFDM symbol shifts are performed such that the REs of CSI-RS patterns resulting from OFDM symbol-shifting of a base CSI-RS pattern are not overlapped with the REs of other types of RSs, for example, CRS REs and DRS REs.

Referring to FIG. 13, a CSI-RS pattern with t-shift: 1 is obtained by shifting Pattern 1-3 by four OFDM symbols and a CSI-RS pattern with t-shift: 2 is obtained by shifting Pattern 1-3 by seven OFDM symbols. A CSI-RS pattern with t-shift: 0 illustrated in FIG. 13 is identical to Pattern 1-3 without OFDM symbol shift, illustrated in FIG. 11.

CSI-RS patterns illustrated in FIGS. 12 and 13 may be used in the same subframe. For example, the CSI-RS patterns illustrated in FIGS. 12(a), 12(b), 12(c), 13(a), and 13(c) are mutually orthogonal, that is, the REs of the CSI-RS patterns are not overlapped with one another. Therefore, the CSI-RS patterns may be used together in one subframe. On the other hand, since REs of the CSI-RS pattern illustrated in FIG. 13(b) are overlapped with REs of the CSI-RS patterns illustrated in FIGS. 12(a), 12(b) and 12(c), the CSI-RS pattern illustrated in FIG. 13(b) and the CSI-RS patterns illustrated in FIGS. 12(a), 12(b) and 12(c) may be used together in the same subframe.

In FIGS. 11, 12 and 13, reference numerals 1 to 8 denote antenna ports that transmit CSI-RSs. For example, CSI-RS antenna port 1 transmits a CSI-RS of a cell on an RE labeled with 1 and CSI-RS antenna port 2 transmits a CSI-RS of the cell on an RE labeled with 2. CSI-RSs transmitted through the CSI-RS antenna ports may be transmitted in predetermined OFDM symbols by Frequency Division Multiplexing (FDM), on predetermined subcarriers by Time Division Multiplexing (TDM), on predetermined REs by Code Division Multiplexing (CDM) using orthogonal cover codes. For example, using Walsh codes of length 2, CSI-RS antenna ports 1 and 5 may transmit CSI-RSs on a predetermined RE, CSI-RS antenna ports 2 and 6 may transmit CSI-RSs on another RE, CSI-RS antenna ports 3 and 7 may transmit CSI-RSs on a third RE, and CSI-RS antenna ports 4 and 8 may transmit CSI-RSs on a fourth RE. As far as one RE is mapped to one antenna port, the numbers of antenna ports illustrated in FIGS. 11, 12 and 13 may be changed.

The BS of a serving cell (i.e. the serving BS) may signal a CSI-RS pattern selected for the serving cell from among a plurality of predefined CSI-RS patterns (for example, the CSI-RS patterns illustrated in FIGS. 11, 12 and 13) to a UE. The serving BS may signal the CSI-RS pattern of the serving cell and the CSI-RS patterns of cells neighboring to the serving cell (hereinafter, neighbor cells) to the UE. For instance, a serving BS may signal the index of a CSI-RS pattern allocated to a serving cell and the index(es) of a CSI-RS pattern(s) allocated to a neighbor cell(s) to a UE, among predefined CSI-RS patterns (for example, CSI-patterns configured according to the foregoing embodiments of the present invention).

In another example, the serving BS may signal the CSI-RS patterns of the serving cell and the neighbor cell(s) to the UE using a bitmap having bits mapped to total available CSI-RS patterns in a one-to-one correspondence. For instance, given five CSI-RS patterns in total, if a second CSI-RS pattern is allocated to the serving cell, the serving BS may transmit a bitmap set to 01000 to the UE, to thereby indicate that a CSI-RS pattern corresponding to the second bit of the bitmap is for the serving cell and the other four CSI-RS patterns are for neighbor cells.

Figure 14:
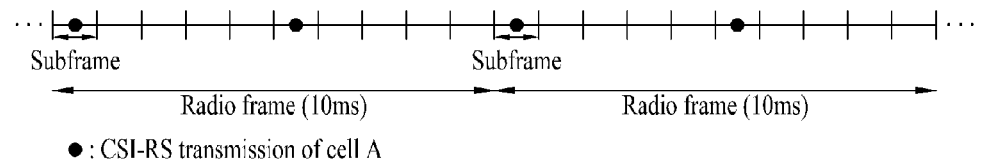
FIG. 14 illustrates an exemplary CSI-RS duty cycle.

FIG. 14 illustrates an exemplary CSI-RS duty cycle.

To prevent an increase in RS overhead, CSI-RSs may be transmitted at every predetermined interval. Referring to FIG. 14, a BS may transmit CSI-RSs in every five subframes, for use in measuring channel states of a specific antenna group belonging to the BS. A UE, which receives a communication signal from the antenna group, may receive the CSI-RSs and thus estimate/measure the state/quality of channels established between the antenna group and the UE.

In the case where CSI-RSs are configured periodically, other orthogonal CSI-RS patterns may further be configured by use of subframe offsets in addition to the CSI-RS patterns illustrated in FIGS. 11, 12 and 13. It is possible to create a new CSI-RS pattern by applying (v, $T_{sub}$), (t, $T_{sub}$) or (v, t, $T_{sub}$) to a base CSI-RS pattern. v represents the degree of subcarrier shift applied to the base CSI-RS pattern, t represents the degree of OFDM symbol shift applied to the base CSI-RS pattern, and $T_{sub}$ represents a subframe offset.

For example, in the case where the number of CSI-RS patterns is increased using subcarrier shifts and subframe offsets, for a CSI-RS duty cycle of 10 ms, v may be one of {0, 1, 2} and $T_{sub}$ may be one of {0, 1, 2, 3, 4, 5, 6, 7, 8, 9}. Referring to FIGS. 11 and 12, for instance, three orthogonal CSI-RS patterns may be produced out of a base CSI-RS patter, Pattern 1-4 through subcarrier shift. Further, 10 orthogonal CSI-RS patterns may be produced by applying $T_{sub}$ to the three CSI-RS patterns. As a result, the number of CSI-RS reuse patterns is increased to 30 (=3×10). Each of neighboring cells may be allocated one of the 30 CSI-RS reuse patterns and transmit its CSI-RSs in the allocated CSI-RS pattern.

When a plurality of cells transmit their CSI-RSs, the positions of subframes carrying the CSI-RSs of the cells and the duty cycles of the CSI-RSs may be issues to be considered. A UE communicating with a single cell (or a single antenna group) has only to detect CSI-RSs in subframes corresponding to the CSI-RS duty cycle of the single cell. For example, referring to FIG. 14, when a UE is located in Cell A and does not communicate with any other cell (hereinafter, referred to as a single-cell UE), the UE does not need to monitor all subframes to detect CSI-RSs. That is, the single-cell UE has only to attempt to detect CSI-RSs only in every fifth subframe, counted from a predetermined subframe carrying CSI-RSs of the Cell A. In contrast, a UE communicating with a plurality of cells (or a plurality of antenna groups) (hereinafter, referred to as a multi-cell UE) has to monitor a large number of subframes unless CSI-RSs are not appropriately configured, because the plurality of cells transmit their CSI-RSs. If the cells have different CSI-RS duty cycles or if the cells transmit CSI-RSs in different subframes in a frame despite the same CSI-RS duty cycle, the number of subframes that the UE should monitor shall increase with the number of cells. The resulting increased processing load of the UE degrades the performance of the UE and thus decreases overall system throughput.

(1) CSI-RS Duty Cycle

Figure 15:
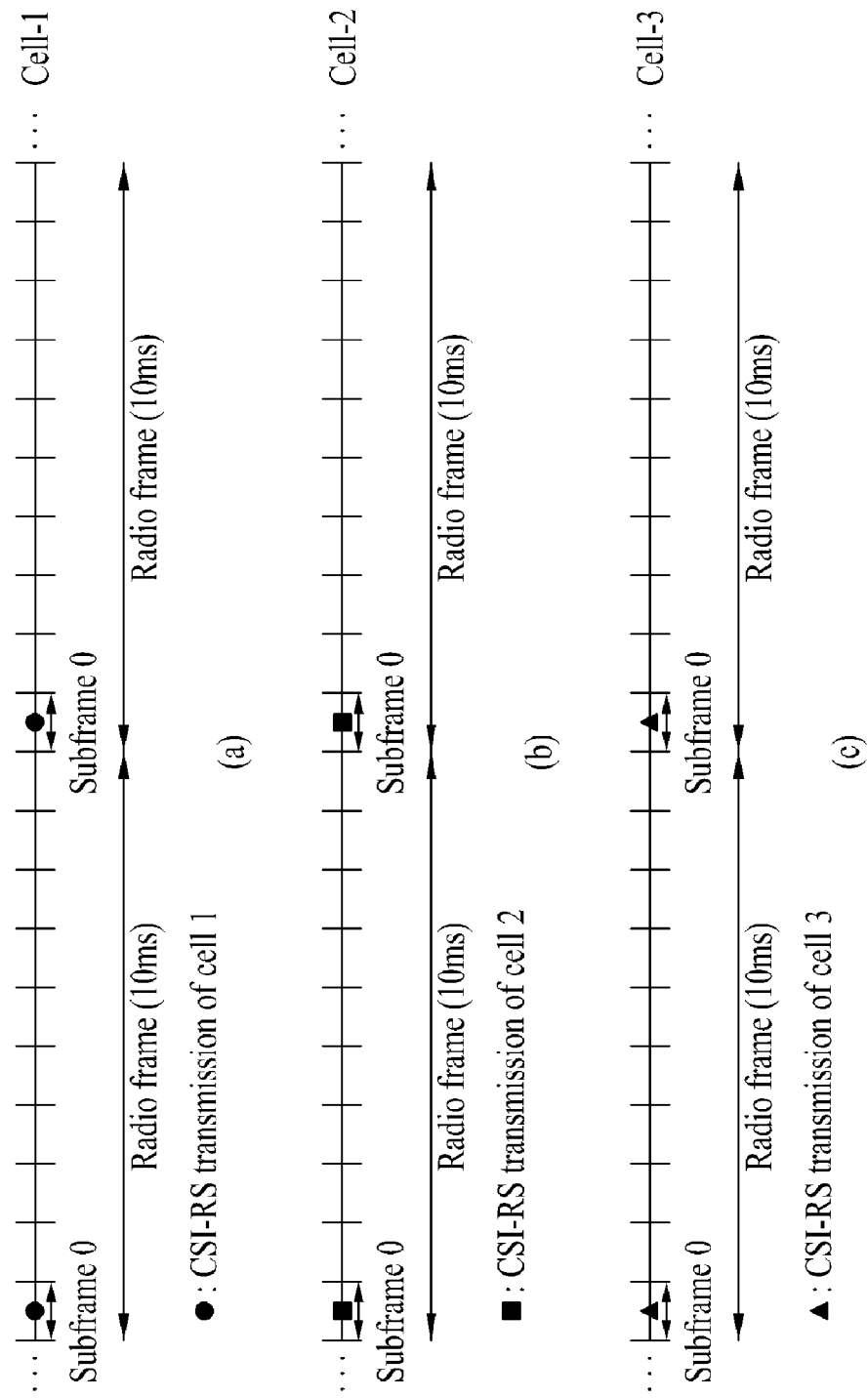
FIG. 15 illustrates CSI-RS transmissions in multiple cells according to an embodiment of the present invention.

FIG. 15 illustrates CSI-RS transmission from multiple cells according to an embodiment of the present invention.

In accordance with the embodiment of the present invention, CSI-RSs of a plurality of neighboring/cooperative cells are configured only in one or subframes, not in all subframes in order to reduce the processing load of UEs and increase system throughput. That is, the neighboring/cooperative cells transmit their CSI-RSs simultaneously in a predetermined subframe. For this purpose, the BS(s) of the cells may transmit their CSI-RSs in the same subframe, for channel estimation at a UE. Notably, the BS(s) uses different CSI-RS patterns for transmission of the CSI-RSs of the cells. The CSI-RS patterns used for the neighboring cells may be those configured according to the embodiments of the present invention illustrated in FIGS. 11, 12 and 13.

Referring to FIG. 15, the BS of Cell 1 transmits CSI-RSs of the Cell 1 in CSI-RS pattern 1 every 10 ms, starting from subframe 0, the BS of Cell 2 transmits CSI-RSs of the Cell 2 in CSI-RS pattern 2 every 10 ms, starting from subframe 0, and the BS of Cell 3 transmits CSI-RSs of the Cell 3 in CSI-RS pattern 3 every 10 ms, starting from subframe 0. Because the CSI-RSs of Cell 1, Cell 2 and Cell 3 are all transmitted every 10 ms, starting from subframe 0, they are carried in the same subframes. CSI-RS pattern 1, CSI-RS pattern 2, and CSI-RS pattern 3 are orthogonal to one another. CSI-RS patterns configured according to the embodiments of the present invention illustrated in FIGS. 11, 12 and 13 may be used as CSI-RS pattern 1, CSI-RS pattern 2, and CSI-RS pattern 3.

Figure 16:
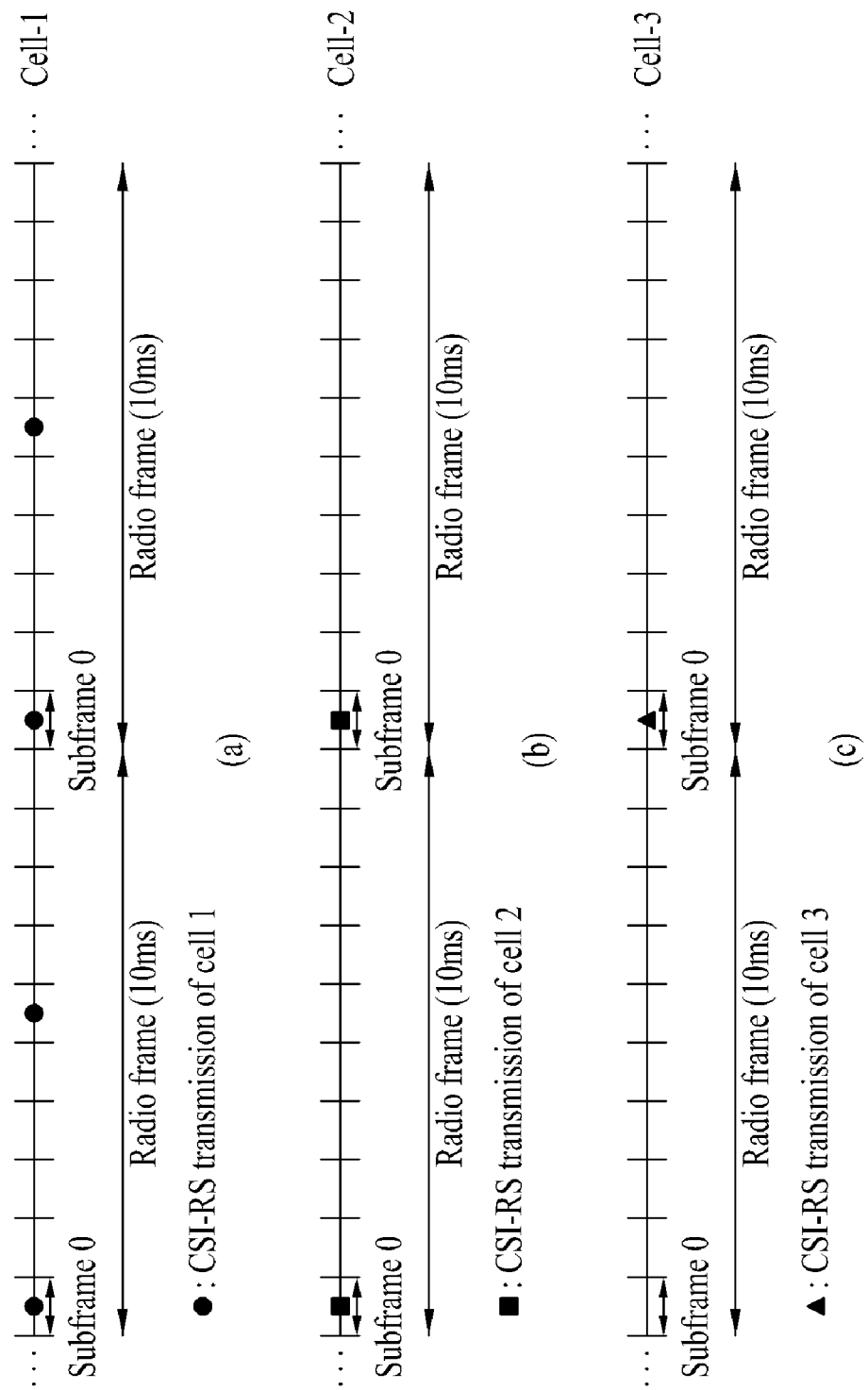
FIG. 16 illustrates CSI-RS transmissions in multiple cells according to another embodiment of the present invention.

FIG. 16 illustrates CSI-RS transmission from multiple cells according to another embodiment of the present invention.

Cells in a predetermined channel estimation set may have CSI-RS duty cycles being integer multiples M of a predetermined value N. N may be pre-defined as the number of subframes, a transmission time, etc. For instance, N may be set to five subframes or 5 ms. According to this embodiment, the duty cycles of neighboring or cooperative cells or the duty cycles of cells in a predetermined channel estimation set may have a relationship of a common multiple or a common divisor. In addition, a CSI-RS duty cycle may be only one of integer multiples of N. That is, a CSI-RS duty cycle may be one of $\{1 \times N, 2 \times N, 3 \times N, \ldots, \text{MAX}_{DutyCycle}\}$. $\text{MAX}_{DutyCycle}$ may be determined according to a channel state variation over time, a system requirement regarding a channel state accuracy, etc.

Referring to FIG. 16, the BS of Cell 1 transmits CSI-RSs of the Cell 1 in CSI-RS pattern 1 every 5 ms, starting from subframe 0, the BS of Cell 2 transmits CSI-RSs in CSI-RS of the Cell 2 pattern 2 every 10 ms, starting from subframe 0, and the BS of Cell 3 transmits CSI-RSs of the Cell 3 in CSI-RS pattern 3 every 20 ms, starting from subframe 0. In this case, the CSI-RSs of Cell 1, Cell 2 and Cell 3 are all transmitted in the same subframe every 20 ms.

The embodiment of the present invention illustrated in FIG. 15 corresponds to a special case with M=1 in the embodiment illustrated in FIG. 16. If M is 1, Cell 1, Cell 2 and Cell 3 transmit CSI-RSs only in predetermined same subframes.

A UE may estimate the channel states of Cell 1, Cell 2 and Cell 3 based on the CSI-RSs of Cell 1, Cell 2 and Cell 3. On the assumption that Cell 1 is a serving cell and Cell 2 and Cell 3 are neighbor cells, a UE within the serving cell may measure the channel states of the neighbor cells only in subframes carrying the CSI-RSs of the serving cell and the neighbor cells. That is, channel estimation may be performed for other cells within a channel estimation set, only in subframes which carry CSI-RSs of all cells of the channel estimation set and thus enable multi-cell channel estimation. In this case, the UE may estimate the channel states of the neighbor cells every 10 ms in FIG. 15 and every 20 ms in FIG. 16. When channel estimation for cells other than the serving cell is allowed only in a predetermined subframe, the UE has only to detect CSI-RSs of the cell other than the serving cell in subframes corresponding to common multiples of CSI-RS duty cycles. Therefore, the complexity of channel estimation is reduced on the part of the UE.

(2) Subframe Offset

For cells of a predetermined channel estimation set to simultaneously transmit their CSI-RSs in a specific subframe, the start subframes of their duty cycles should be appropriately defined. If different cells transmit CSI-RSs with different subframe offsets, there may not exist any subframe carrying CSI-RSs of all cells of the channel estimation set. Therefore, to allow a UE to perform channel estimation only on a specific subframe, it is preferred that CSI-RS transmissions from the cells of the channel estimation set coincide in at least one subframe. If CSI-RSs of the cells in the channel estimation set are all transmitted in a specific subframe, they are transmitted altogether in every subframe corresponding to a common multiple of their duty cycles, from then on.

For this purpose, let X subframes corresponding to the longest $\text{DutyCycle}_{MAX}$ of the CSI-RS duty cycles of the cells in the channel estimation set be sequentially numbered from 0 to X−1. Then, it is possible to define that CSI-RSs of the cells are transmitted only in subframes with subframe numbers corresponding to the same remainder when the subframe numbers are divided by the shortest $\text{DutyCycle}_{MIN}$ of the CSI-RS duty cycles of the cells in the channel estimation set. If the remainder is defined as a subframe offset, the subframe offset may be given as MathFigure 1

$$\text{SubframeOffset} = \text{SubframeNumber in DutyCycle}_{MAX} \pmod{\text{DutyCycle}_{MIN}} \quad \text{[Math.1]}$$

Referring to FIG. 16, if Cell 1, Cell 2 and Cell 3 are to be channel-estimated, $\text{DutyCycle}_{MAX}$ is 20 ms and 20 subframes corresponding to 20 ms are numbered from 0 to 19. Since DutyCycle$_{MIN}$ is 5 ms, there are 5 subframes corresponding to 5 ms, and Cell 1 transmits CSI-RSs in subframes of which remainders are 0 when dividing their subframe numbers by 5, Cell 2 and Cell 3 also transmit CSI-RSs in subframes of which remainders are 0 when dividing their subframe numbers by 5.

In another example, the subframes of each radio frame may be numbered from 0 to 9 and CSI-RSs of cells are transmitted only in subframes having subframe numbers which result in the same remainder when being divided by N. For instance, if N is 5, the cells of a specific channel estimation set may transmit CSI-RSs in subframes having subframe numbers that result in the same remainder when being divided by 5. If the remainder of dividing a subframe number by N is a subframe offset, the subframe offset may be expressed as MathFigure 2

$$\text{SubframeOffset} = \text{SubframeNumber in a radio frame} \pmod{N} \quad \text{[Math.2]}$$

The serving BS may transmit information about a CSI-RS duty cycle and a subframe offset to the UE. For example, the following table may be used as duty cycle information and subframe offset information.

TABLE 1

| $I_{cycle, subframe\ offset}$ | Duty cycle | Subframe offset |
| --- | --- | --- |
| $I_{cycle, subframe\ offset} \leq 4$ | 5 | $I_{cycle, subframe\ offset}$ |
| $5 \leq I_{cycle, subframe\ offset} \leq 14$ | 10 | $I_{cycle, subframe\ offset} - 5$ |
| $15 \leq I_{cycle, subframe\ offset} \leq 34$ | 20 | $I_{cycle, subframe\ offset} - 15$ |
| $35 \leq I_{cycle, subframe\ offset} \leq 74$ | 40 | $I_{cycle, subframe\ offset} - 35$ |
| $75 \leq I_{cycle, subframe\ offset} \leq 154$ | 80 | $I_{cycle, subframe\ offset} - 75$ |

In Table 1, $I_{cycle, subframe\ offset}$ represents a duty cycle and a subframe offset for CSI-RS transmission. Referring to Table 1, if $I_{cycle, subframe\ offset}$ is equal to or larger than 5 and equal to or smaller than 14, CSI-RSs are transmitted in every 10 subframes, starting from a subframe with number $I_{cycle, subframe\ offset} - 5$ in a radio frame. $I_{cycle, subframe\ offset}$ may be determined by higher layer signaling such as Medium Access Control (MAC) signaling or Radio Resource Control (RRC) signaling. $I_{cycle, subframe\ offset}$ may be the same value for neighboring cells or cells of a specific channel estimation set. Alternatively or additionally, $I_{cycle, subframe\ offset}$ may be different for the cells as long as the $I_{cycle, subframe\ offset}$ values have the same remainder of dividing them by 5.

The BS(s) of the cells within the channel estimation set may determine or adjust $I_{cycle, subframe\ offset}$ for the cells and transmit the determined or adjusted $I_{cycle, subframe\ offset}$ to UEs within the cells. A UE may determine or obtain the CSI-RS duty cycle and subframe offset of its serving cell based on the received $I_{cycle, subframe\ offset}$.

<Channel Estimation for Multiple Cells>

Once CSI-RSs are configured for a plurality of cells using different CSI-RS patterns to avoid CSI-RS collision among the cells, the CSI-RSs may be used for measuring interference from neighbor cells or estimating channels of the neighboring cells.

To accurately estimate the channel state/quality of a neighbor cell, RE muting may be used in the multi-cell system. RE muting aims to estimate CSI-RSs transmitted from a neighbor cell without interference that a data signal from a serving cell causes to the CSI-RSs of the neighbor cell by muting data REs of the serving cell corresponding to CSI-RS REs in a CSI-RS pattern of the neighbor cell. Therefore, RE muting is generally applied to a CSI-RS RE(s) of another cell or other cells.

Figure 17:
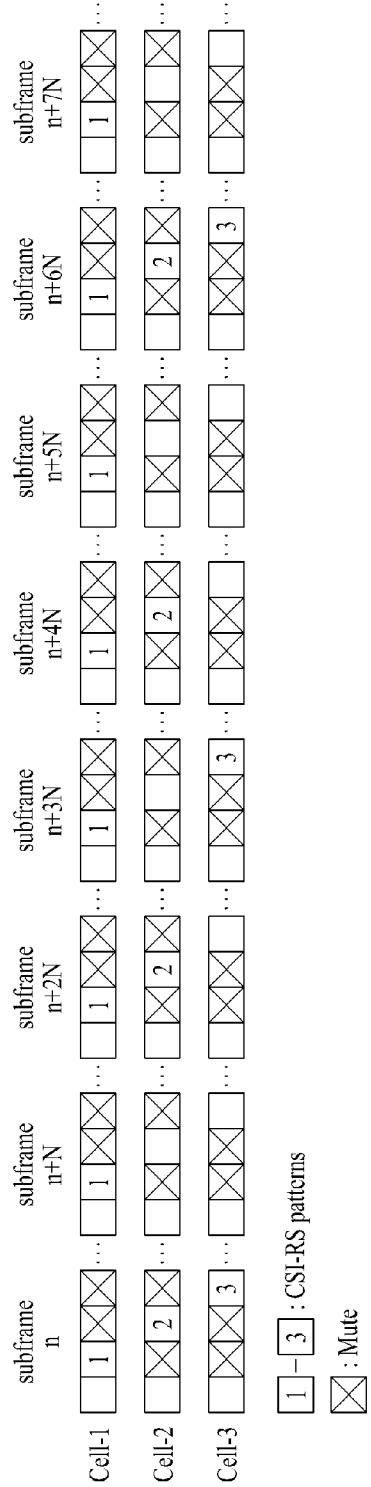
FIGS. 17, 18 and 19 illustrate Resource Element (RE) muting in a multi-cellular system according to embodiments of the present invention.
Figure 18:
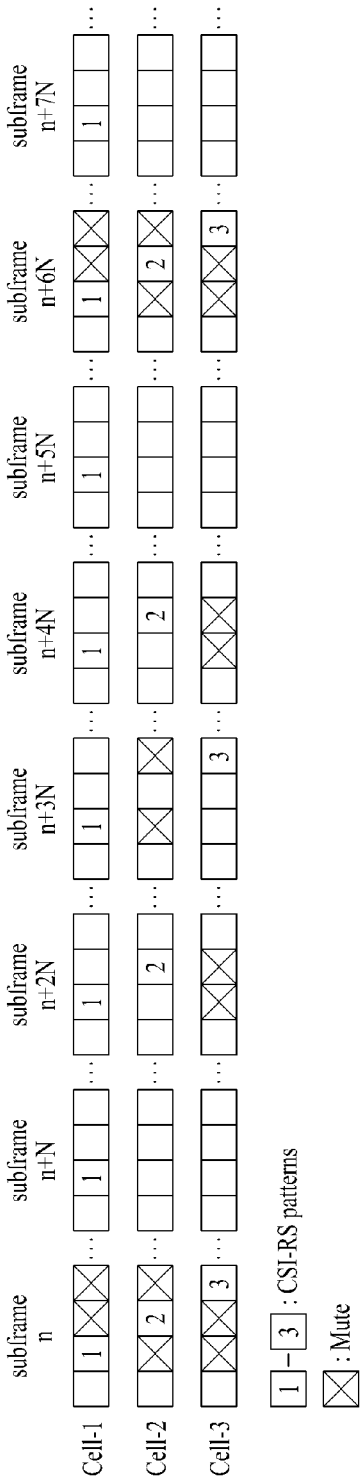
Figure 19:
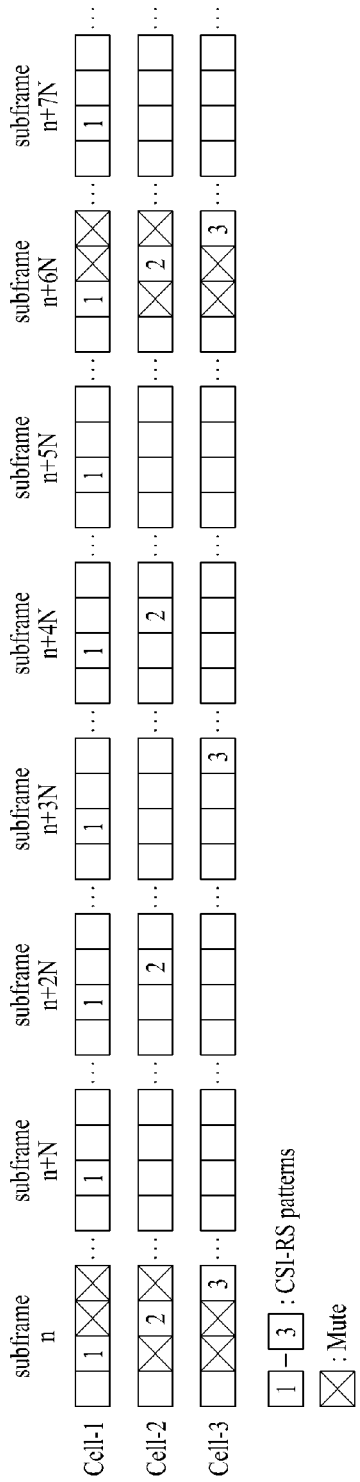

RE muting may be confined to a specific subframe or a specific RB. FIGS. 17, 18 and 19 illustrate RE muting in the multi-cell system according to embodiments of the present invention.

For the convenience's sake of description, it is assumed that a channel estimation set includes Cell-1, Cell-2 and Cell-3, CSI-RSs are transmitted every N subframes in CSI-RS pattern 1 within Cell-1, CSI-RSs are transmitted every 2×N subframes in CSI-RS pattern 2 within Cell-2, and CSI-RSs are transmitted every 3×N subframes in CSI-RS pattern 3 within Cell-3. The same BS or different BSs may cover the cells. The following description is given of embodiments of RE muting with the appreciation that BS1, BS2 and BS3 manage Cell-1, Cell-2 and Cell-3, respectively, by way of example. Further, the embodiments of RE muting will be described in the context of the CSI-RS transmission illustrated in FIG. 16.

(1) Embodiment 1 for RE Muting

RE muting may be applied to a subframe carrying CSI-RSs of at least one of the cells of a predetermined channel estimation set. For this purpose, RE muting may be designed based on the shortest of the CSI-RS duty cycles of the cells of the channel estimation set.

Referring to FIG. 17, the shortest of the CSI-RS duty cycles of Cell-1, Cell-2 and Cell-3 is N. Thus RE muting is applicable to every $N^{th}$ subframe. BS1 may configure CSI-RS pattern 1 in every N subframes, while muting REs occupied by CSI-RS pattern 2 and CSI-RS pattern 3 in every N subframes. BS2 may configure CSI-RS pattern 2 in every 2×N subframes, while muting REs occupied by CSI-RS pattern 1 and CSI-RS pattern 3 in every N subframes. BS3 may configure CSI-RS pattern 3 in every 3×N subframes, while muting REs occupied by CSI-RS pattern 1 and CSI-RS pattern 2 in every N subframes.

(2) Embodiment 2 for RE Muting

In Embodiment 1 for RE muting, RE muting takes place in every N subframes. Because muted REs are not available for data transmission, system throughput decreases with the number of muted REs. The purpose of RE muting lies in enabling a UE within a serving cell to more accurately measure the channel states of other cells. In this context, RE muting is performed on a subframe carrying CSI-RSs of all cells of a predetermined channel estimation set in Embodiment 2 for RE muting. Embodiment 2 for RE muting advantageously reduces the number of muted and thus wasted REs because a muting cycle is longer than in Embodiment 1 for RE muting.

Referring to FIG. 18, on the part of Cell-1, CSI-RSs of other cells, Cell-2 and Cell-3 are transmitted in every 6×N subframes. 6×N is a common multiple of 2×N and 3×N. Therefore, BS1 configures CSI-RS pattern 1 in every N subframes, muting REs occupied by CSI-RS pattern 2 and CSI-RS pattern 3 in every 6×N subframes. On the part of Cell-2, CSI-RSs of other cells, Cell-1 and Cell-3 are transmitted in every 3×N subframes. 3×N is a common multiple of 1×N and 3×N. Therefore, BS2 configures CSI-RS pattern 2 in every 2×N subframes, muting REs occupied by CSI-RS pattern 1 and CSI-RS pattern 3 in every 3×N subframes. Similarly, BS3 configures CSI-RS pattern 3 in every 3×N subframes, muting REs occupied by CSI-RS pattern 1 and CSI-RS pattern 2 in every 2×N subframes.

(3) Embodiment 3 for RE Muting

If multi-cell channel estimation is allowed only for a subframe carrying CSI-RSs of all cells of a channel estimation set, RE muting applies only to the subframe allowing channel estimation. Therefore, unnecessary RE muting overhead can be reduced.

Referring to FIG. 19, because CSI-RSs of Cell-1, Cell-2 and Cell-3 are transmitted altogether in every 6×N subframes to enable a UE to perform channel estimation for other cells only during a predetermined time period, BS1, BS2 and BS3 apply RE muting in every 6×N subframes. For instance, BS1 may transmit CSI-RSs in every N subframes according to CSI-RS pattern 1, muting REs occupied by CSI-RS pattern 2 and CSI-RS pattern 3 in every 6×N subframes.

In Embodiment 1, Embodiment 2, and Embodiment 3 for RE muting, a BS may signal information indicating CSI-RS REs of a serving cell (e.g. information indicating a CSI-RS pattern of the serving cell) to a UE or UEs within its coverage.

However, the UE or UEs may not determine REs on which a signal from the serving cell has been nulled, even though they have knowledge of the REs carrying CSI-RSs of the serving cell. Accordingly, the BS may transmit information indicating muted CSI-RS REs to the UE or UEs within its coverage in Embodiment 1, Embodiment 2 and Embodiment 3 for RE muting. For example, the BS may transmit information indicating muted CSI-RS pattern among available CSI-RS patterns to the UE or UEs. The muted CSI-RS patterns may be indicated by their indexes. Alternatively or additionally, a bitmap with bits one to one corresponding to CSI-RS patterns is formed and bits corresponding to muted CSI-RS patterns are set to a predetermined value in the bitmap, thereby indicating the muted CSI-RS patterns among available CSI-RS patterns.

For example, if there are three available CSI-RS patterns, CSI-RS pattern 1, CSI-RS pattern 2, and CSI-RS pattern 3, BS1 covering Cell-1 may transmit a bitmap of 011 to a UE or UEs. In the bitmap, 0 represents a non-muted CSI-RS pattern and 1 represents a muted CSI-RS pattern. As the serving cell transmits CSI-RSs on the non-muted CSI-RS pattern, the CSI-RS pattern corresponding to 0 in the bitmap is for the serving cell.

In addition, the BS may transmit information indicating an RE muting cycle and the position of a subframe including muted REs to the UE or UEs in Embodiment 1, Embodiment 2, and Embodiment 3 for RE muting. That is, the BS may transmit information indicating radio resources to which RE muting is applied to the UE or UEs. For example, the information may specify the RE muting cycle and the position of the subframe including the muted REs. For instance, the following table may be used as the information indicating the RE muting cycle (muting cycle) and the position of the subframe including the muted REs (subframe offset).

TABLE 2

| $I_{muting,subframe\ offset}$ | Muting cycle | Subframe offset |
| --- | --- | --- |
| $I_{muting,subframe\ offset} \leq 4$ | 5 | $I_{muting,subframe\ offset}$ |
| $5 \leq I_{muting,subframe\ offset} \leq 14$ | 10 | $I_{muting,subframe\ offset} - 5$ |
| $15 \leq I_{muting,subframe\ offset} \leq 34$ | 20 | $I_{muting,subframe\ offset} - 15$ |
| $35 \leq I_{muting,subframe\ offset} \leq 74$ | 40 | $I_{muting,subframe\ offset} - 35$ |
| $75 \leq I_{muting,subframe\ offset} \leq 154$ | 80 | $I_{muting,subframe\ offset} - 75$ |

In Table 2, $I_{muting,subframe\ offset}$ denotes an RE muting cycle and a subframe offset. If $I_{muting,subframe\ offset}$ is equal to or larger than 5 and equal to or smaller than 14, this means that REs occupied by the CSI-RS patterns of other cells are muted in every 10 subframes, starting from a subframe with number $I_{muting,subframe\ offset} - 5$. $I_{muting,subframe\ offset}$ may be determined by higher layer signaling such as MAC signaling or RRC signaling.

Each BS in a predetermined channel estimation set may determine or adjust $I_{muting,subframe\ offset}$ for its cell and transmit the determined or adjusted $I_{muting,subframe\ offset}$ to a UE or UEs within the cell. The UE or UEs can be aware of muted REs based on $I_{muting,subframe\ offset}$.

In Embodiment 1, Embodiment 2 and Embodiment 3 for RE muting, RE muting may be applicable only to a specific RB, not the entire RBs of a subframe. For example, BS1 managing Cell-1 may apply RE muting only to an even-numbered RB, for Cell-2 and only to an odd-numbered RB, for Cell-3. Alternatively or additionally, BS1 may apply RE muting to a predetermined RB set (RB set 1) for Cell-2 and to another predetermined RB set (RB set 2) for Cell-3. This RE muting may be performed at a subframe level. For instance, BS1 may apply RE muting to an $n^{th}$ subframe, for Cell-2 and to an $(n+1)^{th}$ subframe, for Cell-3, among subframes carrying CSI-RSs of all cells of a channel estimation set.

A UE may receive CSI-RSs of the neighbor cells on the muted REs and estimate/measure the channel states/quality of the neighbor cells using the CSI-RSs. For example, referring to FIGS. 17, 18 and 19, a UE within Cell-1 may receive CSI-RSs in CSI-RS pattern 2 and estimate the channel of Cell-2 based on the CSI-RSs, and may receive CSI-RSs in CSI-RS pattern 3 and estimate the channel of Cell-3 based on the CSI-RSs.

Meanwhile, a subframe carrying CSI-RSs of the serving cell and the neighbor cells always contains muted REs in Embodiment 1, Embodiment 2 and Embodiment 3 for RE muting. Therefore, the UE may more accurately estimate the channel state of the serving cell in the subframe because a signal or signals from a neighbor cell or neighbor cells are not positioned at the CSI-RS REs of the serving cell.

<Multi-Cell Interference Measurement>

Multi-cell interference measurement is critical to channel state estimation/quality measurement of a serving cell.

In Method 1, a BS configures predetermined radio resources for interference measurement and a UE measures neighbor cell interference based on a signal received in the radio resources. If a serving cell mutes specific radio resources, a UE within the serving cell may determine a signal received on the muted REs to be interference. Unless radio resources in which a signal from the serving cell is muted are pre-defined, the UE does not know REs in which the UE is supposed to measure interference. Therefore, the serving BS may signal radio resources designated for interference measurement to the UE. For example, the BS may periodically and/or non-periodically transmit information indicating radio resources (e.g. a frame, subframe, RB, etc.) in which interference should be measured to the UE. For the UE to accurately measure interference from neighbor cells, it is preferred that a signal from the serving cell is muted and signals from the neighbor cells are not muted in the interference measurement radio resources. For example, if a specific frame, subframe or RB is signaled as interference measurement radio resources to the UE, the specific frame, subframe or RB preferably contains an RE on which the signal of the serving cell is muted but the signals of the neighbor cells are not muted.

In Method 2, for measuring interference from neighbor cells, CSI-RSs received on muted REs according to one of the embodiments for RE muting may be used. Specifically, the serving BS transmits null signals on the CSI-RS REs of neighbor cells, that is, mutes the CSI-RS REs of the neighbor cells. Then the UE receives the CSI-RSs of the neighbor cells on the REs in which the serving cell has muted its signals and measures interference from the neighbor cells based on the received strengths of the CSI-RSs of the neighbor cells. However, this method has a drawback in that when the neighbor cells do not transmit DL signals, that is, the neighbor cells do not schedule any DL signal, strong interference is measured in spite of actual weak interference.

To avoid this problem, interference from the neighbor cells may be estimated by subtracting a predetermined CSI-RS value from a signal value transmitted on subcarriers carrying the CSI-RSs of the serving cell in Method 3. That is, since a signal received on the CSI-RS REs of the serving cell at a UE is the sum of CSI-RSs and interference, the interference may be estimated by subtracting the strength of the CSI-RSs from the strength of the received signal. If the positions of CSI-RS REs are used for measuring interference in this manner, the problem encountered with Method 1 still exists because CSI-RS REs of other cells are muted REs of the serving cell for interference measurement. Accordingly, it is not appropriate to use the positions of CSI-RSs of other cells on which signals of the serving cell are muted, for multi-cell interference measurement.

Meanwhile, the serving BS may transmit information indicating CSI-RS REs of the serving cell and/or CSI-RS REs of the neighbor cells to a UE. Alternatively or additionally, the CSI-RS REs and muted REs of the serving cell may be signaled to the UE. The information has been described before in the embodiments of <CSI Configuration> and/or the embodiments of <Multi-Cell Channel Estimation>. Even though the information indicates the CSI-RS REs and muted REs of the serving cell, it is difficult to indicate muted REs of the neighbor cells with the information. For example, referring to FIG. 18, when a UE within Cell-1 measures interference on REs occupied by CSI-RS pattern 1 in subframe n+2N, Cell-3 transmits null signals according to CSI-RS pattern 1 and thus the interference measurement does not reflect the influence of interference from Cell-3.

To prevent a UE from measuring interference on muted REs of neighbor cells, a BS may notify the UE that the UE is allowed to measure interference on at least one of REs which carry CSI-RSs of the serving cell and on which signals of the neighbor cells are not muted. That is, the BS may transmit to the UE information indicating radio resources to which RE muting applies.

For example, the information may specify an interference measurement RE cycle and/or the position of a subframe carrying muted REs. For example, the following table may be used as the information indicating an interference measurement cycle and the position of a subframe in which interference is to be measured (subframe offset).

TABLE 3

| $I_{interference,subframe\ offset}$ | Interference measurement cycle | Subframe offset |
|---|---|---|
| $I_{interference,subframe\ offset} \leq 4$ | 5 | $I_{interference,subframe\ offset}$ |
| $5 \leq I_{interference,subframe\ offset} \leq 14$ | 10 | $I_{interference,subframe\ offset} - 5$ |
| $15 \leq I_{interference,subframe\ offset} \leq 34$ | 20 | $I_{interference,subframe\ offset} - 15$ |
| $35 \leq I_{interference,subframe\ offset} \leq 74$ | 40 | $I_{interference,subframe\ offset} - 35$ |
| $75 \leq I_{interference,subframe\ offset} \leq 154$ | 80 | $I_{interference,subframe\ offset} - 75$ |

In Table 3, $I_{interference,subframe\ offset}$ denotes an interference measurement cycle and a subframe offset. If $I_{interference,subframe\ offset}$ is equal to or larger than 5 and equal to or smaller than 14, this means that REs which are occupied by the CSI-RSs of the serving cell and on which signals from the neighbor cells are not muted exist in every 10 subframes, starting from a subframe with number $I_{interference,subframe\ offset} - 5$. $I_{interference,subframe\ offset}$ may be determined by higher layer signaling such as MAC signaling or RRC signaling.

The serving BS may receive information indicating muted REs of the neighbor cells from the BSs of the neighbor cells, determine or adjust $I_{interference,subframe\ offset}$ for UEs within the serving cell, and transmit the determined or adjusted $I_{interference,subframe\ offset}$ to the UEs. The UEs are aware of interference measurement REs according to $I_{interference,subframe\ offset}$.

Meanwhile, if RE muting is allowed only for a specific subframe carrying CSI-RSs of all cells within a channel estimation set as in the embodiment of FIG. 19, neighbor cells will also apply RE muting only to the specific subframe. Therefore, once a UE has knowledge of the CSI-RS REs and muting pattern of the serving cell, the UE may know REs on which the CSI-RSs of the serving cell are transmitted and any of neighbor cells does not mute their signals. Accordingly, if CSI-RSs are configured and RE muting is applied as in the embodiment of FIG. 18, the BS may transmit information indicating a CSI-RS pattern and a CSI-RS duty cycle and information indicating an RE muting pattern and an RE muting cycle as information indicating interference measurement REs to the UE. The UE may determine non-muted REs of the neighbor cells among the CSI-RS REs of the serving cell based on the received information. The UE may measure interference in the serving cell by removing the influence of the CSI-RSs of the serving cell from the strength of a signal received on the REs.

As stated before, RE muting may be performed according to an RE muting cycle, particularly on a specific RB instead of a whole subframe. In this case, the UE may perform channel estimation only on an RE-muted RB or RE-muted RBs in a subframe. For instance, when RE muting is applied only to even-numbered RBs, the UE may estimate the channel of the serving cell using CSI-RSs of the serving cell transmitted in the even-numbered RBs and estimate the channels of the neighbor cells using CSI-RSs of the neighbor cells transmitted in the even-numbered RBs. In the mean time, the interference to the serving cell may be measured using signals received on CSI-RS REs of the serving cell among the REs of odd-numbered RBs.

In this embodiment, the UE is configured so that it does not measure multi-cell interference in an RB/subframe containing muted REs and measures multi-cell interference only in an RB/subframe carrying CSI-RSs of the serving cell without muted REs. According to the present invention, the BS may provide the UE with information indicating radio resources allocated to the CSI-RSs of the serving cell and radio resources muted by the neighbor cells. For example, information indicating an interference measurement cycle and/or a subframe containing CSI-RSs available for interference measurement may be transmitted to the UE. Or the UE may provide information indicating interference measurement radio resources to the BS.

The UE may identify an RB/subframe containing muted REs and an RB/subframe carrying CSI-RSs of the serving cell without muted REs based on the information. Therefore, the UE may detect CSI-RSs of the neighbor cells from muted REs and estimate the channels of the neighbor cells using the detected CSI-RSs. In addition, the UE may measure interference from a neighbor cell(s) to the channel of the serving cell using a signal received on REs allocated to the CSI-RSs of the serving cell among RBs/subframes that do not contain muted REs.

Figure 20:
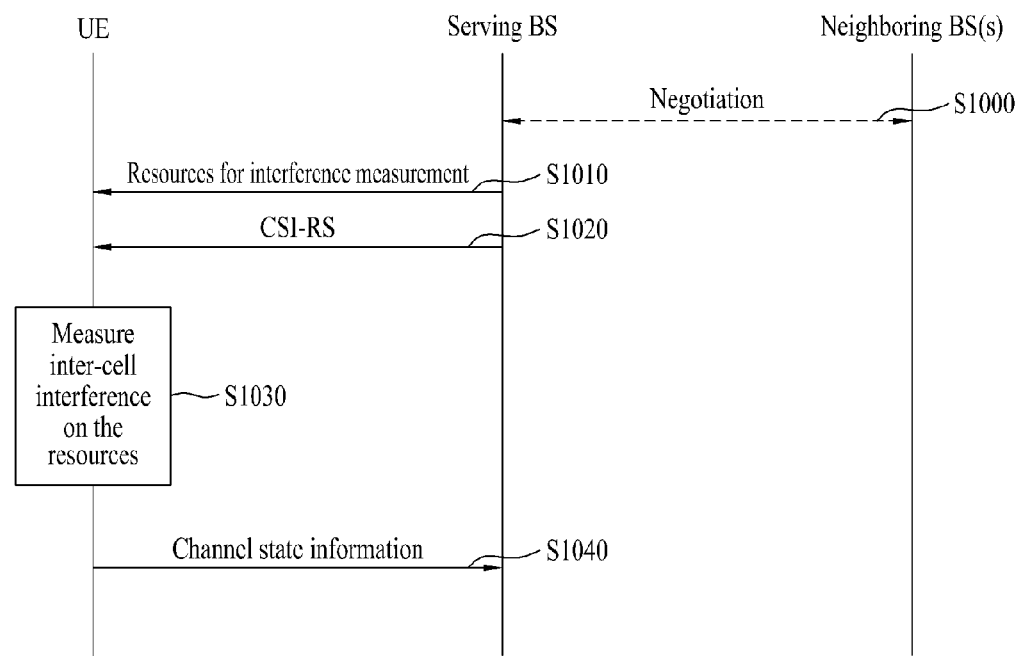
FIG. 20 is a diagram illustrating a signal flow for an operation for measuring multi-cell interference according to the present invention.

FIG. 20 is a diagram illustrating a signal flow for an operation for measuring multi-cell interference according to the present invention.

A serving BS may transmit explicit or implicit information indicating interference measurement radio resources (e.g. a frame, subframe, RB, etc.) to a UE within a serving cell (S1010). For example, the serving BS may configure a subframe for interference measurement and transmit information indicating the interference measurement subframe to the UE.

The serving BS may determine interference measurement radio resources (e.g. a frame, subframe, RB, etc.) by negotiating with a BS (BSs) of a neighbor cell (neighbor cells) (referred to as a neighbor BS or neighbor BSs) and transmit information indicating the interference measurement radio resources to the UE. For example, the serving BS may determine a CSI-RS configuration and RE muting by negotiating with the neighbor BS(s) (S1000) and transmit the information to the UE according to the determined CSI-RS configuration and RE muting. The serving BS may transmit CSI-RSs of the serving cell according to one of the embodiments of <CSI Configuration> and/or <Multi-Cell Channel Estimation>. The serving BS may determine or adjust a CSI-RS pattern, duty cycle, and subframe offset of the serving cell, a CSI-RS pattern(s), a duty cycle(s), and a subframe offset(s) of the neighbor cell(s) through communication with the neighbor BS(s). Further, the serving BS may determine or adjust an RE muting cycle, a subframe carrying muted REs, and/or a subframe offset.

As done in a method described in <Multi-Cell Interference Measurement>, the BS may notify the UE of interference measurement radio resources (e.g. a frame, subframe, RB, etc.) by transmitting information indicating the interference measurement radio resources to the UE. For example, the BS may indicate interference measurement radio resources to the UE by transmitting information indicating an RB/subframe available for interference measurement and/or the duty cycle of the RB/subframe to the UE. That is, the BS may signal radio resources carrying CSI-RSs of the serving cells among radio resources other than RE-muted radio resources of the serving cell or the neighbor cell(s) so that the UE can explicitly determine radio resources in which it is supposed to measure interference. Alternatively or additionally, as in another embodiment described in <Multi-Cell Interference Measurement>, the BS may implicitly indicate interference measurement radio resources to the UE by signaling information indicating radio resources in which the serving cell or the neighbor cell(s) performs RE muting.

The serving BS may transmit CSI-RSs to the UE so that the UE may estimate the state of a channel established between the antenna group of the serving BS or the cell and the UE (S1020).

The UE may measure interference on REs explicitly indicated by the BS or non-muted REs (S1030). For example, the UE may receive a signal on REs explicitly or implicitly signaled by the BS and estimate interference caused to the serving cell by the neighbor cell(s) by removing the influence of the CSI-RSs of the serving cell from the received signal according Method 3. The UE may be aware of the influence of the CSI-RSs of the serving cell based on the result of channel estimation of the serving cell according to one of the embodiments described in <Multi-Cell Channel Estimation>.

The UE may feedback the interference measurement result and/or channel state estimation result to the BS. The UE may generate channel state/quality information based on the interference measurement result and the channel state estimation result and feedback the channel state/quality information to the BS (S1040).

The processor 400b of the serving BS may generate explicit or implicit information indicating interference measurement radio resources (e.g. a frame, subframe, RB, etc.) for a UE(s) within the serving cell and may control the transmitter 100b of the serving BS to transmit the information to the UE(s) (S1010).

The processor 400b of the serving BS may be configured so as to negotiate interference measurement radio resources (e.g. a frame, subframe, RB, etc.) with a neighbor BS(s) (S1000). The processor 400b of the serving BS may generate information indicating the interference measurement radio resources. For example, the processor 400b of the serving BS may configure CSI-RSs of the serving cell and/or the neighbor cell(s) according to one of the embodiments of <CSI Configuration> and/or <Multi-Cell Channel Estimation>. The processor 400b of the serving BS may determine or adjust a CSI-RS pattern, duty cycle, and subframe offset of the serving cell, a CSI-RS pattern(s), a duty cycle(s), and a subframe offset(s) of the neighbor cell(s) and generate their information. In addition, the processor 400b of the serving BS may determine an RE muting cycle and a subframe offset for a subframe including muted REs and generate information about the RE muting cycle and subframe offset. The transmitter 100b of the serving BS may transmit the information to the UE(s) under the control of the processor 400b of the serving BS.

As done in an embodiment described in <Multi-Cell Interference Measurement>, the serving BS processor 400b may generate information indicating an RB/subframe carrying interference measurement CSI-RSs and the duty cycle of the RB/subframe and control the transmitter 100b to transmit the information to the UE(s). The processor 400a of a UE may determine the interference measurement radio resources based on the received information. Alternatively or additionally, as in another embodiment described in <Multi-Cell Interference Measurement>, the serving BS processor 400b may generate information indicating RE-muted radio resources of the serving cell or the neighbor cell(s) and control the transmitter 100b to transmit the information to the UE. The processor 400a of the UE may measure interference in non-muted REs based on the information received through the receiver 300a of the UE.

The serving BS processor 400b may control the transmitter 100b of the serving BS to transmit CSI-RSs to the UE so that the UE may estimate the state of a channel established between the antenna group of the serving BS or the cell and the UE (S1020).

The processor 400a of the UE may measure interference in radio resources explicitly or implicitly indicated by the BS (S1030). The receiver 300a of the UE may receive a signal in REs explicitly or implicitly signaled by the BS under the control of the processor 400a of the UE. For example, the processor 400a of the UE may estimate interference caused to the serving cell by the neighbor cell(s) by removing the influence of the CSI-RSs of the serving cell from the received signal according to Method 3. The UE processor 400a may measure the influence of the CSI-RSs of the serving cell based on the result of channel estimation of the serving cell according to one of the embodiments described in <Multi-Cell Channel Estimation>.

The UE processor 400a may feedback the interference measurement result and/or channel state estimation result to the BS. For example, the UE processor 400a may generate channel state/quality information based on the interference measurement result and the channel state estimation result.

The UE transmitter 100a may feedback the channel state/quality information to the serving BS under the control of the UE processor 400a (S1040).

The present invention prevents collision between CSI-RS transmissions from multiple cells through appropriate configuration of CSI-RSs of the multiple cells. Since RE muting is applied to a predetermined RB or subframe and a UE performs channel estimation on the RB or subframe carrying muted REs, channel estimation performance of the multiple cells is increased. Interference measurement performance is increased by signaling radio resources available for interference measurement to a UE. Furthermore, since the UE is prohibited from measuring interference in an RB/subframe carrying muted REs, the interference measurement performance is further increased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention can be applied to a BS, a UE, or other communication devices in a wireless communication system.

The invention claimed is:

1. A method for measuring, by a user equipment, interference in a wireless communication system, the method comprising:
    receiving, by the user equipment, interference measurement resource information for a serving cell, the interference measurement resource information indicating radio resources for interference measurement; and
    performing the interference measurement using the indicated radio resources,
    wherein the indicated radio resources are muted radio resources in which a group of antenna ports associated with the serving cell transmits one or more signals including a channel state information reference signal (CSI-RS) at zero transmission power to the user equipment, and
    wherein the indicated radio resources are configured with at least one of a plurality of predefined CSI-RS resource patterns for the CSI-RS transmission.

2. The method according to claim 1, wherein the interference measurement resource information includes subframe information indicating an interference measurement subframe which includes the radio resources for the interference measurement.

3. The method according to claim 2, wherein the subframe information includes information indicating a subframe cycle, at which the radio resources for the interference measurement occurs, and a subframe offset for the radio resources for the interference measurement.

4. The method according to claim 1, wherein the plurality of predefined CSI-RS resource patterns include CSI-RS patterns for 8 antenna ports,
    wherein each of the CSI-RS patterns for 8 antenna ports defines 8 resource elements (REs) for the CSI-RS transmission per resource block pair, the resource block pair consisting of 12 subcarriers and 14 orthogonal frequency division multiplexing (OFDM) symbols,
    wherein the 8 REs for the CSI-RS transmission in each of the CSI-RS patterns for 8 antenna ports are defined by a set of 4 subcarriers in a frequency domain of the resource block pair and 2 OFDM symbols in a time domain of the resource block pair, and
    wherein the 2 OFDM symbols are corresponding to a first OFDM symbol set consisting of OFDM symbols 5 and 6 among OFDM symbols 0 to 6 of an even numbered slot, a second OFDM symbol set consisting of OFDM symbols 2 and 3 among OFDM symbols 0 to 6 of an odd numbered slot, or a third OFDM symbol set consisting of OFDM symbols 5 and 6 among the OFDM symbols 0 to 6 of the odd numbered slot.

5. The method according to claim 4, wherein the set of 4 subcarriers consists of 2 sets of 2 consecutive subcarriers.

6. The method according to claim 4, wherein the 8 antenna ports are mapped to 8 REs of one of the CSI-RS patterns for the 8 antenna ports in units of 2 antenna ports by using Walsh codes of length 2.

7. The method according to claim 4, wherein the CSI-RS patterns for the 8 antenna ports include a first CSI-RS pattern defined by a first set of 4 subcarriers and the first OFDM symbol set, a second CSI-RS pattern defined by the first set of 4 subcarriers and the second OFDM symbol set, a third CSI-RS pattern defined by the first set of 4 subcarriers and the third OFDM symbol set, a fourth CSI-RS pattern defined by a second set of 4 subcarriers and one of the first to third OFDM symbol sets, and a fifth CSI-RS pattern defined by a third set of 4 subcarriers and the one of the first to third OFDM symbol sets,
    wherein the first to fifth CSI-RS patterns are orthogonal to each other.

8. A method for receiving, by a base station, channel state information in a wireless communication system, the method comprising:
    transmitting, to a user equipment, interference measurement resource information for a serving cell, the interference measurement resource information indicating radio resources for interference measurement; and
    receiving, from the user equipment, channel state information generated based on the interference measurement performed by the user equipment using the indicated radio resources,
    wherein the indicated radio resources include muted radio resources in which a group of antenna ports associated with the serving cell transmits one or more signals including a channel state information reference signal (CSI-RS) at zero transmission power to the user equipment, and
    wherein the indicated radio resources are configured with at least one of a plurality of predefined CSI-RS resource patterns for the CSI-RS transmission.

9. The method according to claim 8, wherein the interference measurement resource information includes subframe information indicating an interference measurement subframe which includes the radio resources for the interference measurement.

10. The method according to claim 9, wherein the subframe information includes information indicating a subframe cycle, at which the radio resources for the interference measurement occurs, and a subframe offset for the radio resources for the interference measurement.

11. The method according to claim 8, wherein the plurality of predefined CSI-RS resource patterns include CSI-RS patterns for 8 antenna ports,
    wherein each of the CSI-RS patterns for 8 antenna ports defines 8 resource elements (REs) for the CSI-RS transmission per resource block pair, the resource block pair consisting of 12 subcarriers and 14 orthogonal frequency division multiplexing (OFDM) symbols, wherein the 8 REs for the CSI-RS transmission in each of the CSI-RS patterns for 8 antenna ports are defined by a set of 4 subcarriers in a frequency domain of the resource block pair and 2 OFDM symbols in a time domain of the resource block pair, and wherein the 2 OFDM symbols are corresponding to a first OFDM symbol set consisting of OFDM symbols 5 and 6 among OFDM symbols 0 to 6 of an even numbered slot, a second OFDM symbol set consisting of OFDM symbols 2 and 3 among OFDM symbols 0 to 6 of an odd numbered slot, or a third OFDM symbol set consisting of OFDM symbols 5 and 6 among the OFDM symbols 0 to 6 of the odd numbered slot.

12. A user equipment for measuring interference in a wireless communication system, comprising:

a receiver; and a processor, operatively coupled to the receiver, configured to control the receiver, wherein the receiver is configured to receive interference measurement resource information for a serving cell, the interference measurement resource information indicating radio resources for interference measurement, and the processor is configured to perform the interference measurement using the indicated radio resources, and wherein the indicated radio resources include muted radio resources in which a group of antenna ports associated with the serving cell transmits one or more signals including a channel state information reference signal (CSI-RS) at zero transmission power to the user equipment, and wherein the indicated radio resources are configured with at least one of a plurality of predefined CSI-RS resource patterns for the CSI-RS transmission.

13. The user equipment according to claim 12, wherein the interference measurement resource information includes subframe information indicating an interference measurement subframe which includes the radio resources for the interference measurement.

14. The user equipment according to claim 13, wherein the subframe information includes information indicating a subframe cycle, at which the radio resources for the interference measurement occurs, and a subframe offset for the radio resources for the interference measurement.

15. The user equipment according to claim 12, wherein the plurality of predefined CSI-RS resource patterns include CSI-RS patterns for 8 antenna ports, wherein each of the CSI-RS patterns for 8 antenna ports defines 8 resource elements (REs) for the CSI-RS transmission per resource block pair, the resource block pair consisting of 12 subcarriers and 14 orthogonal frequency division multiplexing (OFDM) symbols, wherein the 8 REs for the CSI-RS transmission in each of the CSI-RS patterns for 8 antenna ports are defined by a set of 4 subcarriers in a frequency domain of the resource block pair and 2 OFDM symbols in a time domain of the resource block pair, and wherein the 2 OFDM symbols are corresponding to a first OFDM symbol set consisting of OFDM symbols 5 and 6 among OFDM symbols 0 to 6 of an even numbered slot, a second OFDM symbol set consisting of OFDM symbols 2 and 3 among OFDM symbols 0 to 6 of an odd numbered slot, or a third OFDM symbol set consisting of OFDM symbols 5 and 6 among the OFDM symbols 0 to 6 of the odd numbered slot.

16. A base station for receiving interference information in a wireless communication system, comprising:

a transmitter;

a receiver; and a processor, operatively coupled to the transmitter and the receiver, configured to control the transmitter and the receiver, wherein the processor is configured to control the transmitter to transmit, to a user equipment, interference measurement resource information for a serving cell, the interference measurement resource information indicating radio resources for interference measurement, and control the receiver to receive channel state information generated based on the interference measurement performed by the user equipment using the indicated radio resources, and wherein the indicated radio resources include muted radio resources in which a group of antenna ports associated with the serving cell transmits one or more signals including a channel state information reference signal (CSI-RS) at zero transmission power to the user equipment, and wherein the indicated radio resources are configured with at least one of a plurality of predefined CSI-RS resource patterns for the CSI-RS transmission.

17. The base station according to claim 16, wherein the interference measurement resource information includes subframe information indicating an interference measurement subframe which includes the radio resources for the interference measurement.

18. The base station according to claim 17, wherein the subframe information includes information indicating a subframe cycle, at which the radio resources for the interference measurement occurs, and a subframe offset for the radio resources for the interference measurement.

19. The base station according to claim 16, wherein the plurality of predefined CSI-RS resource patterns include CSI-RS patterns for 8 antenna ports, wherein each of the CSI-RS patterns for 8 antenna ports defines 8 resource elements (REs) for the CSI-RS transmission per resource block pair, the resource block pair consisting of 12 subcarriers and 14 orthogonal frequency division multiplexing (OFDM) symbols, wherein the 8 REs for the CSI-RS transmission in each of the CSI-RS patterns for 8 antenna ports are defined by a set of 4 subcarriers in a frequency domain of the resource block pair and 2 OFDM symbols in a time domain of the resource block pair, and wherein the 2 OFDM symbols are corresponding to a first OFDM symbol set consisting of OFDM symbols 5 and 6 among OFDM symbols 0 to 6 of an even numbered slot, a second OFDM symbol set consisting of OFDM symbols 2 and 3 among OFDM symbols 0 to 6 of an odd numbered slot, or a third OFDM symbol set consisting of OFDM symbols 5 and 6 among the OFDM symbols 0 to 6 of the odd numbered slot.

* * * * *